(12) United States Patent
Bohnhoff

(10) Patent No.: US 7,593,742 B2
(45) Date of Patent: *Sep. 22, 2009

(54) RECEIVED COMMUNICATION SIGNAL PROCESSING METHODS AND COMPONENTS FOR WIRELESS COMMUNICATION EQUIPMENT

(75) Inventor: Peter Bohnhoff, Munich (DE)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/845,514

(22) Filed: Aug. 27, 2007

(65) Prior Publication Data

US 2007/0293255 A1    Dec. 20, 2007

Related U.S. Application Data

(63) Continuation of application No. 10/794,125, filed on Mar. 5, 2004, now Pat. No. 7,263,376.

(60) Provisional application No. 60/452,484, filed on Mar. 5, 2003, provisional application No. 60/452,342, filed on Mar. 5, 2003, provisional application No. 60/452,343, filed on Mar. 5, 2003.

(51) Int. Cl.
*H04B 15/00* (2006.01)
*H04B 7/005* (2006.01)
*H04B 7/01* (2006.01)
*H04B 7/015* (2006.01)

(52) U.S. Cl. ............ 455/502; 375/224; 375/259; 375/260; 375/325; 375/340; 375/349

(58) Field of Classification Search ........... 455/130, 455/313, 323, 327, 334, 522, 502; 375/147, 375/148, 150, 224, 259, 260, 325, 340, 349; 370/335, 342

See application file for complete search history.

(56) References Cited

U.S. PATENT DOCUMENTS

| 6,160,841 | A | * | 12/2000 | Stansell et al. ............ 375/148 |
| 6,229,843 | B1 | | 5/2001 | Lomp et al. |
| 6,370,397 | B1 | | 4/2002 | Popovic et al. |
| 6,414,984 | B1 | | 7/2002 | Stahle |

(Continued)

FOREIGN PATENT DOCUMENTS

EP    1128565    8/2001

(Continued)

OTHER PUBLICATIONS

Third Generation Partnership Project, "Technical Specification Group Radio Access Network; Physical Channels and Mapping of Transport Channels on Physical Channels (FDD), (Release 1999)," 3GPP TS 25.211 v3.12.0 (Sep. 2002).

(Continued)

*Primary Examiner*—Quochien B Vuong
(74) *Attorney, Agent, or Firm*—Volpe and Koenig, P.C.

(57) ABSTRACT

A wireless transmit receive unit (WTRU) and methods are used in a wireless communication system to process sampled received signals to establish and/or maintain wireless communications. A selectively controllable coherent accumulation unit produces power delay profiles (PDPs). A selectively controllable post processing unit passes threshold qualified magnitude approximation values and PDP positions to a device such as a rake receiver to determine receive signal paths.

14 Claims, 14 Drawing Sheets

U.S. PATENT DOCUMENTS

| | | |
|---|---|---|
| 6,470,000 B1 | 10/2002 | Burns et al. |
| 6,580,749 B1 | 6/2003 | Miura |
| 6,650,694 B1 * | 11/2003 | Brown et al. ............... 375/150 |
| 6,728,304 B2 | 4/2004 | Brown et al. |
| 6,829,290 B1 | 12/2004 | Schmidl et al. |
| 6,952,181 B2 * | 10/2005 | Karr et al. .................. 342/457 |
| 7,082,286 B2 | 7/2006 | Kaewell et al. |
| 2001/0046221 A1 | 11/2001 | Ostman et al. |
| 2002/0176489 A1 | 11/2002 | Sriram et al. |
| 2003/0147365 A1 * | 8/2003 | Terasawa et al. ............ 370/335 |
| 2003/0152167 A1 | 8/2003 | Oh et al. |
| 2003/0157892 A1 | 8/2003 | Reznik et al. |
| 2003/0161416 A1 | 8/2003 | Meyer et al. |
| 2004/0062298 A1 | 4/2004 | McDonough et al. |
| 2004/0242181 A1 | 12/2004 | Hepler |

FOREIGN PATENT DOCUMENTS

| | | |
|---|---|---|
| JP | 2001-285140 | 10/2001 |
| WO | 93/19552 | 9/1993 |

OTHER PUBLICATIONS

Third Generation Partnership Project, "Technical Specification Group Radio Access Network; Physical Channels and Mapping of Transport Channels of Physical Channels (FDD), (Release 4)," 3GPP TS 25.211 v4.6.0 (Sep. 2002).

Third Generation Partnership Project, "Technical Specification Group Radio Access Network; Physical Channels and Mapping of Transport Channels of Physical Channels (FDD), (Release 5)," 3GPP TS 25.211 v5.2.0 (Sep. 2002).

Third Generation Partnership Project, "Technical Specification Group Radio Access Network; Physical Channels and Mapping of Transport Channels of Physical Channels (FDD), (Release 5)," 3GPP TS 25.211 v5.3.0 (Dec. 2002).

* cited by examiner

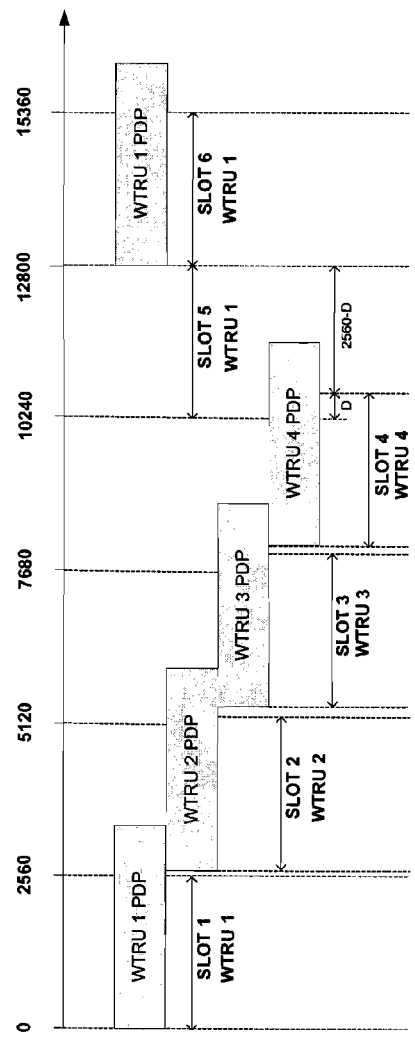
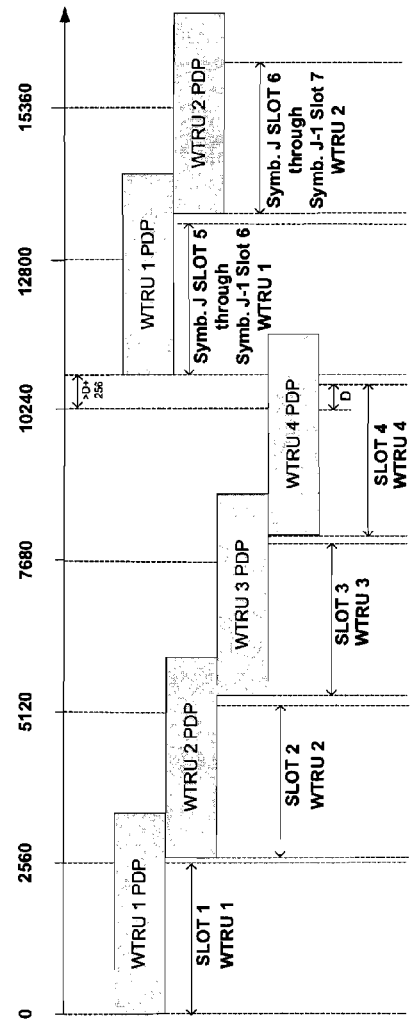

RECEIVED COMMUNICATION SIGNAL PROCESSING METHODS AND COMPONENTS FOR WIRELESS COMMUNICATION EQUIPMENT

CROSS REFERENCE TO RELATED APPLICATION

This application is a continuation of U.S. patent application Ser. No. 10/794,125, filed Mar. 5, 2004 which claims the benefit of U.S. Provisional Patent Application No. 60/452,484, filed Mar. 5, 2003, U.S. Provisional Patent Application No. 60/452,342, filed Mar. 5, 2003 and U.S. Provisional Patent Application No. 60/452,343, filed Mar. 5, 2003 which are incorporated by reference as if fully set forth herein.

FIELD OF THE INVENTION

The present invention relates to methods and components for wireless communication equipment and, in particular, methods and components for facilitating initiation and maintenance of wireless communications.

BACKGROUND

Wireless telecommunication systems are well known in the art. In order to provide global connectivity for wireless systems, standards have been developed and are being implemented. One current standard in widespread use is known as Global System for Mobile Telecommunications (GSM). This is considered as a so-called Second Generation mobile radio system standard (2G) and was followed by its revision (2.5G). GPRS and EDGE are examples of 2.5G technologies that offer relatively high speed data service on top of (2G) GSM networks. Each one of these standards sought to improve upon the prior standard with additional features and enhancements. In January 1998, the European Telecommunications Standard Institute—Special Mobile Group (ETSI SMG) agreed on a radio access scheme for Third Generation Radio Systems called Universal Mobile Telecommunications Systems (UMTS). To further implement the UMTS standard, the Third Generation Partnership Project (3GPP) was formed in December 1998. 3GPP continues to work on a common third generational mobile radio standard.

A typical UMTS system architecture in accordance with current 3GPP specifications is depicted in FIG. 1. The UMTS network architecture includes a Core Network (CN) interconnected with a UMTS Terrestrial Radio Access Network (UTRAN) via an interface known as Iu which is defined in detail in the current publicly available 3GPP specification documents. The UTRAN is configured to provide wireless telecommunication services to users through wireless transmit receive units (WTRUs), known as User Equipments (UEs) in 3GPP, via a radio interface known as Uu. The UTRAN has one or more Radio Network Controllers (RNCs) and base stations, known as Node Bs in 3GPP, which collectively provide for the geographic coverage for wireless communications with UEs. One or more Node Bs are connected to each RNC via an interface known as Iub in 3GPP. The UTRAN may have several groups of Node Bs connected to different RNCs; two are shown in the example depicted in FIG. 1. Where more than one RNC is provided in a UTRAN, inter-RNC communication is performed via an Iur interface.

Communications external to the network components are performed by the Node Bs on a user level via the Uu interface and the CN on a network level via various CN connections to external systems.

In general, the primary function of base stations, such as Node Bs, is to provide a radio connection between the base stations' network and the WTRUs. Typically a base station emits common channel signals allowing non-connected WTRUs to become synchronized with the base station's timing. In 3GPP, a Node B performs the physical radio connection with the UEs. The Node B receives signals over the Iub interface from the RNC that control the radio signals transmitted by the Node B over the Uu interface.

A CN is responsible for routing information to its correct destination. For example, the CN may route voice traffic from a UE that is received by the UMTS via one of the Node Bs to a public switched telephone network (PSTN) or packet data destined for the Internet. In 3GPP, the CN has six major components: 1) a serving General Packet Radio Service (GPRS) support node; 2) a gateway GPRS support node; 3) a border gateway; 4) a visitor location register; 5) a mobile services switching center; and 6) a gateway mobile services switching center. The serving GPRS support node provides access to packet switched domains, such as the Internet. The gateway GPRS support node is a gateway node for connections to other networks. All data traffic going to other operator's networks or the internet goes through the gateway GPRS support node. The border gateway acts as a firewall to prevent attacks by intruders outside the network on subscribers within the network realm. The visitor location register is a current serving network's 'copy' of subscriber data needed to provide services. This information initially comes from a database which administers mobile subscribers. The mobile services switching center is in charge of 'circuit switched' connections from UMTS terminals to the network. The gateway mobile services switching center implements routing functions required based on current location of subscribers. The gateway mobile services also receives and administers connection requests from subscribers from external networks.

The RNCs generally control internal functions of the UTRAN. The RNCs also provide intermediary services for communications having a local component via a Uu interface connection with a Node B and an external service component via a connection between the CN and an external system, for example overseas calls made from a cell phone in a domestic UMTS.

Typically an RNC oversees multiple base stations, manages radio resources within the geographic area of wireless radio service coverage serviced by the Node Bs and controls the physical radio resources for the Uu interface. In 3GPP, the Iu interface of an RNC provides two connections to the CN: one to a packet switched domain and the other to a circuit switched domain. Other important functions of the RNCs include confidentiality and integrity protection. Background specification data for such systems are publicly available and continue to be developed.

In general, commercial wireless systems utilize a well defined system time frame format for the transmission of wireless communication signals. In communication systems such as Third Generation Partnership Project (3GPP) Time Division Duplex (TDD) and Frequency Division Duplex (FDD) systems, multiple shared and dedicated channels of variable rate data are combined for transmission. However, irrespective of whether a system is based on TDD or FDD, received wireless signals must be decoded in accordance with the timeframe structure with which they are transmitted.

One of the first tasks to be performed in the initiation of a wireless communication is to determine the relative timing of a received signal for synchronization. In modern systems, there are various levels of synchronization, such as, carrier, frequency, code, symbol, frame and network synchronization. At each level, synchronization can be divided into two phases: acquisition (initial synchronization) and tracking (fine synchronization).

A typical wireless communication system, such as specified in the 3rd Generation Partnership Project (3GPP), sends downlink communications from a base station to one or a plurality of User Equipments (UEs) and uplink communications from UEs to the base station. A receiver within each UE operates by correlating, or despreading, a received downlink signal with a known code sequence. The code sequence is synchronized to the received sequence in order to get the maximal output from the correlator.

A receiver may receive time offset copies of a transmitted communication signal known as multi-path. In multi-path fading channels, the signal energy is dispersed over a certain amount of time due to distinct echo paths and scattering. To improve performance, the receiver can estimate the channel by combining the multi-path copies of the signal. If the receiver has information about the channel profile, one way of gathering signal energy is then to assign several correlator branches to different echo paths and combine their outputs constructively. This is conventionally done using a structure known as a RAKE receiver.

Conventionally, a RAKE receiver has several "fingers", one for each echo path. In each finger, a path delay with respect to some reference delay, such as the direct or the earliest received path, must be estimated and tracked throughout the transmission. The estimation of the path's initial position in time may be obtained by using a multi-path search algorithm. The multi-path search algorithm does an extensive search through correlators to locate paths with a desired chip accuracy. RAKE receivers are able to exploit multi-path propagation to benefit from path diversity of transmitted signal. Using more than one path, or ray, increases the signal power available to the receiver. Additionally, it provides protection against fading since several paths are unlikely to be subject to a deep fade simultaneously. With suitable combining, this can improve the received signal-to-noise ratio, reduce fading and ease power control problems.

During reception, it is not always possible to separate the received energy into components attributable to distinct multipath components. This may happen, for example, if the relative delays of the various arriving paths are very small compared to the duration of a chip. Such situations often arise in indoor and urban communication channels. The problem is often referred to as the "Fat Finger Effect." Accordingly, RAKE receivers have been developed that are capable of identifying the Fat fingers, such as the RAKE receiver disclosed in U.S. patent application Ser. No. 10/304,894, RECEIVER FOR WIRELESS TELECOMMUNICATION STATIONS AND METHOD published as Publication No. US-2003-0157892-A1 on Aug. 21, 2003 and owned by the assignee of the present invention. FIG. 2 is an illustration of the processing of a received wireless communication signal with a preferred RAKE receiver that includes Fat finger allocation.

As illustrated in FIG. 2, the received wireless communication system is subject to an initial cell search preprocessing before RAKE finger allocation. The initial preprocessing identifies reception of a specific signal sequence such as a pilot sequence or, for example, a preamble sequence of a Random Access Channel (RACH). Various methods of searching for and identifying known transmitted signal sequences are know in the art. For example, such methods and apparatus are disclosed in U.S. patent application Ser. No. 10/322,184, APPARATUS AND METHOD OF SEARCHING FOR KNOWN SEQUENCES published as Publication No. US-2003-0161416 on Aug. 28, 2003 and owned by the assignee of the present invention.

There are several purposes why a sequence of symbols known to the receiver might be sent out from a transmitter, for example, channel estimation with respect to timing delay, amplitude and phase such as in a path search; signaling for (slotted) ALOHA multiple access collision detection and access granting such as with RACH preamble detection; and signaling of timing relations and even code group allocations, such as in a cell search.

In cases where lower level signaling is involved, there are usually several different known sequences that possibly can be sent out, and the signaling value is dependent on which one is found. Therefore, the search has to be performed over all available possible, or relevant, sequences.

The exact receive timing of a known sequence is often not known. Unfortunately, this is exactly the parameter of interest, e.g., for RACH preamble, if the distance and therefore the propagation latency between transmitter and receiver are not known. Additionally, the transmit timing can be completely unknown, such as in cell searching; or the reception of the known sequence could be in different replicas with respect to timing, amplitude and phase, but these parameters would then be of particular interest, such as in path searching.

In general, there is a certain time window when the sequence is expected to be received, which is constituted by some transmit timing relationship, or simply the repetition rate if the sequence is repeatedly sent out on a regular basis. Therefore, on the receive side, a search for the sequence is made within the time window, typically by repeated correlation of the incoming received signal at consecutive instances in time followed by a search of maxima or threshold comparison in the output signal of the correlator. This operation of correlation at consecutive time instances can be viewed as finite impulse response (FIR) filtering of the incoming signal using the expected sequence as the coefficients for the FIR filter. This is in line with the idea of using a matched filter for detection.

In a 3GPP system, the known sequences of symbols are transmitted using a pulse shaping filter of the root-raised-cosine (RRC) type. On the receiver side, an RRC-type filter matched to this transmit pulse is used. The combination of both filters, in time domain the convolution, is then of the raised-cosine (RC) type. FIG. 3 shows an impulse response of an RC filter in time domain, with a filter roll-off factor of 0.22 as used in 3GPP, and being normalized to 1.0 as the maximum amplitude. Amplitude magnitude in dB of the impulse response for the filter of FIG. 3, is shown in FIG. 4.

If the transmit and receive timing for a symbol are fully aligned, the received signal amplitude is at maximum and for neighboring symbols spaced at integer multiples of the symbol duration Tc, the received signal is zero. This is one of the essential properties of these types of filters and is the reason why this type of filter is used in this application.

If the exact symbol timing is not known, and the reception is off by some timing offset, then the received signal amplitude is not at maximum any more. With the search of a known sequence with unknown timing, the exact symbol timing will typically not be met. Accordingly, this type of error almost always occurs.

If the search for a known sequence is performed spaced in time at Tc, then the maximum possible timing error is Tc/2, and the amplitude degradation resulting from this, as shown in FIG. 4, is about 4 dB, which is prohibitive for performance reasons. For a sequence search performed spaced at Tc/2, the maximum timing error is Tc/4, and the amplitude degradation 0.94 dB.

In view of the above, performing full correlations at a rate of Tc/2 is the approach most widely seen in current approaches to the challenge of a known sequence search with unknown timing. For example, FIG. 5 shows a system model 10 in which a dirac pulse 12 is applied to a sequence FIR filter 14 which is applied to a root-raised cosine (RRC) FIR filter 18 forming part of the channel 16. At the receiver end, a root-raised-cosine (RRC) FIR filter 20 receives the transmitted signal, filter 20 being matched to the transmit pulse. The combination of the filters 18 and 20, function as a raised-cosine (RC) type filter. A known sequence detector 22 is used in the signal processing chain. After the interpolation, the post-processing, e.g., maximum search or threshold detection is performed at stage 22.

Omission of an FIR filter structure from the signal processing chain results in a search for the known sequence by correlation to either suffer from severe performance degradation or to require the already major chip rate processing complexity to be doubled. For example, FIG. 6 shows the "brute force" method wherein the known sequence detector 22 includes a correlator finite impulse response (FIR) filter 24, which receives the incoming signal at the rate of two samples per chip and provides its output to the peak search detector 25, likewise operating at the rate of two samples per chip.

By comparison, the implementation disclosed in Publication No. US-2003-0161416, referenced above and shown in FIG. 7, provides the incoming signal to the sequence correlator FIR filter 24 at the rate of one sample per chip. Its output, also at one sample per chip, is directly applied to a multiplexer 28 as well as an estimation filter 26, which preferably is a four (4)-tap FIR filter. The signal is applied to FIR filter 24 at the rate of one sample per chip and its output, likewise, at the one sample per chip rate, is processed by the estimation FIR filter 26. The multiplexer 28 receives the two signal streams and alternates passage of these streams to the peak search/detector 25 which performs the peak search/detection operation at a rate of two samples per chip. However, even this improved approach is not optimum with respect to the processing effort.

SUMMARY

A wireless transmit receive unit (WTRU) and methods are used in a wireless communication system to process sampled received signals to establish and/or maintain wireless communications. A selectively controllable coherent accumulation unit produces power delay profiles. A selectively controllable post processing unit passes threshold qualified magnitude approximation values and PDP positions to a device such as a rake receiver to determine receive signal paths.

In one aspect of the invention, various configurations for the post processing of produced PDPs are provided. A power delay profile (PDP) production unit produces groups G1-GN of corresponding PDPs each having a selected number L of sequential elements that have values representing coherent accumulation of sequential sets of received samples mixed with a known sequence wherein sets of corresponding PDPs are defined by PDPs from each group such that for all PDPs of a set of corresponding PDPs, each PDP element is produced based upon coherent accumulation processing using the same known sequence. A post processing unit is configured to select less than L/2 PDP elements of each PDP and to store the selected PDP elements' values and respective PDP position values. The post processing unit selectively combines stored PDP values such that the values of elements of each PDP of a set of corresponding PDPs that are stored for the same respective PDP position are combined. The post processing unit evaluates the combined values for respective PDP positions against selected thresholds to pass threshold qualified combined values and respective position values for further signal processing for use in determining in received signal paths of signals transmitted with the known sequence with which the respective PDP elements are produced.

The post processing unit can be configured to select N highest values of each PDP, where N is >2 and <L/2. Where the PDP element values contain in-phase and quadrature components, the post processing unit can be configured to selectively combine stored PDP element values by coherent combination for threshold evaluation. In that case, the post processing unit preferably computes a magnitude approximation value for each combined value that is threshold qualified so that the threshold qualified magnitude approximation values and respective position values are utilized in determining received signal paths. As an alternative, the post processing unit can be further configured to compute a magnitude approximation value for each stored PDP element value, noncoherently combine magnitude approximation values corresponding PDP element values that are coherently combined and separately evaluate both coherently and noncoherently combined values against thresholds to qualify values of respective PDP positions for further signal processing in determining received signal paths.

Where the PDP element values processed by the post processing unit are magnitude approximations of coherent accumulations of sequential sets of signal samples, the post processing unit is preferably configured to selectively combine stored PDP element values by noncoherent combination for threshold evaluation.

The post processing unit can be configured to select a limited number of PDP elements from a first group G1 of PDPs, and store those elements' values and respective position values and then store elements' values and respective position values of respectively positioned elements from each corresponding PDP of a PDP set as each other group of PDPs is processed. In that case, a limited number of other elements from PDPs which do not match any positions of the elements selected from the PDPs of the first group G1 are also selected and stored for threshold qualification. The post processing unit can be configured to select elements from the first group G1 PDPs based on selecting the highest N values of PDP elements where N is less than L/4. Alternatively, the post processing unit can be configured to select elements from the group G1 PDPs by threshold qualification where the threshold is set such that less than L/4 elements are selected from each of the first group G1 PDPs.

A method of processing power delay profiles (PDPs) is provided where groups G1-GN of corresponding PDPs each having a selected number L of sequential elements having values representing coherent accumulation of sequential sets of received samples mixed with a known sequence wherein sets of corresponding PDPs are defined by PDPs from each group such that for all PDPs of a set of corresponding PDPs, each PDP element being produced based upon coherent accumulation processing using the same known sequence. The method includes selecting less than L/2 PDP elements of each PDP and storing the selected PDP elements' values and respective PDP position values. The stored PDP values are selectively combined such that the values of elements of each PDP of a set of corresponding PDPs that are stored for the same respective PDP position are combined. The combined values for respective PDP positions are evaluated against selected thresholds. Threshold qualified combined values and respective position values are passed for further signal processing for use in determining in received signal paths of signals transmitted with the known sequence with which the respective PDP elements are produced. Variations of the method are made in accordance with the desired configuration and parameters.

In another aspect of the invention directed to coherent accumulation, an antenna system receives wireless signals and produces at least one sequential stream of received signal samples at a selected rate. A sequential array of N vector correlators VC[1] to VC[N] are provided, each configured for coherently accumulating L sized sets of sequential received signal samples. The vector correlators are preferably coupled with the antenna system such that for any given series of N+L−1 samples, S1 to SN+L−1, where the sample S1 is to be a first element of a set processed by the first vector correlator VC[1], each vector correlator VC[i], where i=1 to N, processes respective samples Si to Si+L−1. A sequence generator is configured to selectively generate known sequences sought to be detected in the received wireless signals. The sequence generator is preferably coupled with the vector correlators such that as each vector correlator VC[i], where i=1 to N, processes a set of L sequential samples within a series of samples S1 to SN+L−1, a generated element Gj of a given known sequence of L generated elements, G0 to GL−1, is mixed with sample Si+j in VC[i] to produce a mixed value that is coherently accumulated in VC[i]. Vector correlator accumulator control circuitry is preferably configured to selectively control an accumulated mixed value output of each vector correlator such that each vector correlator outputs an accumulated value after accumulating a selected multiple M of sets of L accumulated mixed values. This results in power delay profiles (PDPs) of a series of at least N elements E1 to EN being produced where each PDP element Ei represents the coherent accumulation of M*L mixed values produced by the vector correlator VC[i], where i=1 to N.

The vector correlator accumulator control circuitry is preferably configured to selectively control an accumulated mixed value output of each vector correlator such that each vector correlator outputs a selected number P of accumulated values. In such case, power delay profiles (PDPs) of a series of N*P elements E1 to EN*P are produced where each PDP element Ei+(j*N) represents the coherent accumulation of M*L mixed values produced by the vector correlator VC[i], where i=1 to N and j=0 to P−1. The antenna system is preferably configured with multiple antennas to produce multiple sequential streams of received signal samples at the selected rate. Each vector correlator preferably includes a controllable antenna switch device configured to select a sample stream from among the multiple sample streams from which to receive samples for processing by the respective vector correlator. Preferably, antenna switch control circuitry controls the antenna switch devices such that for any given series of N+L−1 samples, S1 to SN+L−1, where the sample S1 is to be a first element of a set processed by the first vector correlator VC[1] received from a particular sample stream, the respective antenna switch device of each vector correlator VC[i], where i=1 to N, is controlled to select the particular sample stream for the vector correlator VC[i] to process respective samples Si to Si+L−1 received therefrom.

The vector correlators can each be configured with a plurality of n accumulator devices AD1 to ADn. In that case, each respective accumulator device ADj, for j=1 to n, is preferably selectively coupled to the sequence generator to receive elements of a common generated sequence for mixing with signal samples processed by the respective vector correlator such that each sample can be processed with n different sequences to produce n accumulations of mixed values. This results in the vector correlator array having the ability to concurrently produce n PDPs, each corresponding to one of the n different sequences. The sequence generator can include a scrambling code generator and n signature code generators. The sequence generator is then preferably configured with n outputs SGO1 to SGOn such that each sequence generator output SGOj outputs a different signature/scrambling code combination sequence of generated elements. Where the vector correlators are each configured with a plurality of n accumulator devices AD1 to ADn, each respective accumulator device ADj, for j=1 to n, is selectively coupled to the sequence generator to receive elements of a common generated sequence for mixing with signal samples processed by the respective vector correlator such that each sample can be processed with n different sequences to produce n accumulations of mixed values. This enables the vector correlator array to concurrently produce n PDPs, each corresponding to one of the n different sequences.

Preferably, the vector correlator array operates at a speed that is 48 times faster than the selected sampling rate. An interpolator can be coupled with the vector correlators and configured to produce expanded PDPs by increasing the number of elements from P to a desired multiple of P through interpolation. A post processing unit preferably processing the expanded PDPs by calculating magnitude approximation values of expanded PDP values and passing magnitude approximation values and associated PDP position values that are qualified by the threshold device to a RAKE receiver type of device. The WTRU can be configured as a Node B or a UE for use in a Universal Mobile Telecommunications System (UMTS).

A method for processing received wireless signals is provided where at least one sequential stream of received signal samples at a selected rate is produced. L sized sets of sequential received signal samples are coherently accumulated using a sequential array of N vector correlators VC[1] to VC[N] such that for any given series of N+L−1 samples, S1 to SN+L−1, where the sample S1 is to be a first element of a set processed by the first vector correlator VC[1], each vector correlator VC[i], where i=1 to N, processes respective samples Si to Si+L−1. Known sequences sought to be detected in received wireless signals are selectively generated and mixed, during coherent accumulation, such that as each vector correlator VC[i], where i=1 to N, processes a set of L sequential samples within a series of samples S1 to SN+L−1, a generated element Gj of a given known sequence of L generated elements, G0 to GL−1, is mixed with sample Si+j in VC[i] to produce a mixed value that is coherently accumulated in VC[i]. An accumulated mixed value output of each vector correlator is selectively controlled such that each vector correlator outputs an accumulated value after accumulating a selected multiple M of sets of L accumulated mixed values whereby power delay profiles (PDPs) of a series of at least N elements E1 to EN are produced where each PDP element Ei represents the coherent accumulation of M*L mixed values produced by the vector correlator VC[i], where i=1 to N. Variations of the method are made in accordance with the desired configuration and parameters.

In a further aspect of the invention the production of power delay profile (PDP) values is selectively controlled. This is particularly useful in path search. A wireless transmit receive unit (WTRU) receives wireless signals from other WTRUs such that the relative timing of each wireless signal as received by the WTRU is known and the wireless signals are defined by series of a predetermined number J of symbols, SYM(0) to SYM(J−1), transmitted in timeslots of system time frames where each symbol has a predetermined bit length B. A power delay profile (PDP) production unit is configured to produce PDPs that each have a selected number L of sequential elements that have values representing coherent accumulation of sequential sets of a selected number p received samples mixed with a known sequence, where p equals B times for a selected positive integer I, p=B*I. The power delay profile production unit is preferably configured to selectively produce successive PDPs with respect to received WTRU wireless signals such that when N wireless signals are concurrently received, PDPs are produced for respective wireless signals in order of earliest to latest received signal, WS(0) to WS(N−1), derived from the known timing, starting with a first earliest received wireless signal WS(0) beginning on the occurrence a symbol SYM(0) with respect to time slot having the receive timing of the first wireless signal WS(0) and continuing successively for each subsequently received wireless signal WS(n), for n=1 to N−1, beginning, after a time alignment delay based on the known timing of the wireless signal WS(n), on the occurrence a symbol SYM((j+(I*n))mod J) with respect to a time slot having the receive timing of the wireless signal WS(n) whereby the processing of the PDP for the latest received wireless signal WS(N−1) begins with a cumulative delay of D chips relative to the start of the symbol SYM((j+(I*(N−1))) mod J) with respect to a time slot having the receive timing of the first wireless signal so that the next PDP produced for the first received wireless signal begins on the occurrence the symbol SYM(K) with respect to a time slot having the receive timing of the first wireless signal WS(0), where K is the greatest integer less than ((j+(I*(N−1))+(D/B)) mod J.

Where it is desired to produce PDPs that have values representing coherent accumulation of sequential sets of received samples representing J symbols so that p=J*B, the power delay profile production unit selectively produces successive PDPs with respect to received WTRU wireless signals such that when N wireless signals are concurrently received, PDPs are produced for respective wireless signals in order of earliest to latest received signal, WS(O) to WS(N−1), derived from the known timing, starting with a first earliest received wireless signal WS(0) beginning on the occurrence a symbol SYM(j) with respect to time slot having the receive timing of the first wireless signal WS(0) and continuing successively for each subsequently received wireless signal WS(n), for n=1 to N−1, beginning, after a time alignment delay based on the known timing of the wireless signal WS(n), on the occurrence a symbol SYM(j) with respect to a time slot having the receive timing of the wireless signal WS(n) whereby the processing of the PDP for the latest received wireless signal WS(N−1) begins with a cumulative delay of D chips relative to the start of the symbol SYM(j) with respect to a time slot having the receive timing of the first wireless signal so that the next PDP produced for the first received wireless signal begins on the occurrence the symbol SYM(K) with respect to a time slot having the receive timing of the first wireless signal WS(0), where K is the greatest integer less than (j+(D/B)) mod J. In one example, a WTRU is configured for use in a Universal Mobile Telecommunications System (UMTS) having system time slot of 2560 chips wherein the power delay profile (PDP) production unit is configured to produce PDPs for wireless signals received on a pilot channel formatted 10 symbols of 256 bits per pilot channel time slot.

A method is provided for controlling power delay profile (PDP) production in a wireless transmit receive unit (WTRU) that receives wireless signals from other WTRUs such that the relative timing of each wireless signal as received by the WTRU is known and the wireless signals are defined by series of a predetermined number J of symbols, SYM(0) to SYM (J−1), transmitted in timeslots of system time frames where each symbol has a predetermined bit length B, where the PDPs each have a selected number L of sequential elements that have values representing coherent accumulation of sequential sets of a selected number p received samples mixed with a known sequence, where p equals B times for a selected positive integer I, p=B*I. Successive PDPs with respect to received WTRU wireless signals are selectively produced such that when N wireless signals are concurrently received, PDPs are produced for respective wireless signals in order of earliest to latest received signal, WS(0) to WS(N−1), derived from the known timing, starting with a first earliest received wireless signal WS(0) beginning on the occurrence a symbol SYM(j) with respect to time slot having the receive timing of the first wireless signal WS(0) and continuing successively for each subsequently received wireless signal WS(n), for n=1 to N−1, beginning, after a time alignment delay based on the known timing of the wireless signal WS(n), on the occurrence a symbol SYM((j+(I*n))mod J) with respect to a time slot having the receive timing of the wireless signal WS(n) whereby the processing of the PDP for the latest received wireless signal WS(N−1) begins with a cumulative delay of D chips relative to the start of the symbol SYM((j+(I*(N−1)))mod J) with respect to a time slot having the receive timing of the first wireless signal so that the next PDP produced for the first received wireless signal begins on the occurrence the symbol SYM(K) with respect to a time slot having the receive timing of the first wireless signal WS(0), where K is the greatest integer less than ((j+(I*(N−1))+(D/B)) mod J.

Other objects and advantages will be apparent to those of ordinary skill in the art based upon the following description of presently preferred embodiments of the invention.

BRIEF DESCRIPTION OF THE DRAWING(S)

FIG. 19 is a processing diagram of timing scheduling of sequence detection for successive path searching with respect to the four received signals transmitted by four different WTRUs of FIG. 18 based on time slot granularity.

FIG. 20 is a processing diagram of timing scheduling of sequence detection for successive path searching with respect to the four received signals transmitted by four different WTRUs of FIG. 18 based on symbol granularity.

TABLE OF ACRONYMS

Figure 1:
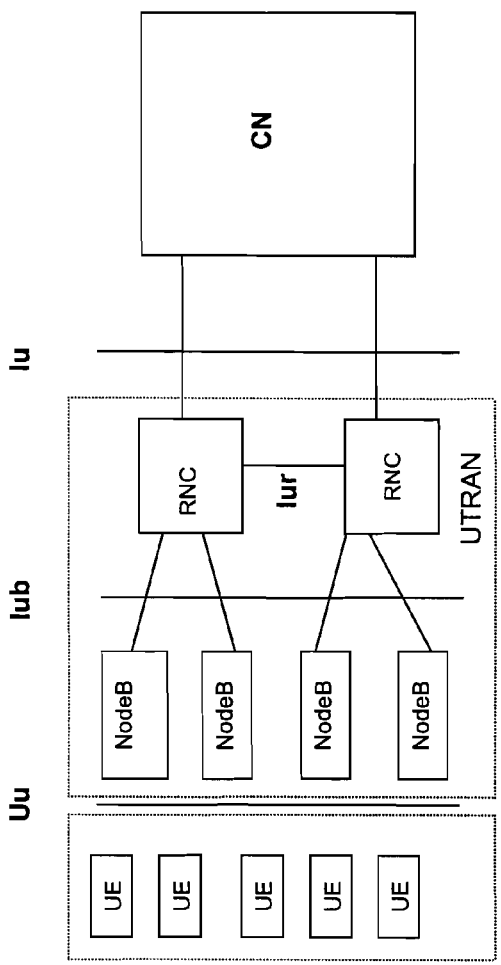
FIG. 1 shows an overview of a system architecture of a conventional UMTS network.

| | |
|---|---|
| 2G | Second Generation Mobile Radio System Standard |
| 3GPP | Third Generation Partnership Project |
| ARIB | Association Of Radio Industries Businesses |
| ASIC | Application Specific Integrated Circuit |
| BLER | Block Error Rate |
| CN | Core Network |
| CPCH | Common Packet Channel |
| DCH | Dedicated Channel |
| DL | Downlink |
| ETSI SMG | European Telecommunications Standard Institute - Special Mobile Group |
| FDD | Frequency Division Duplex |
| GPRS | General Packet Radio Service |
| GSM | Global System For Mobile Telecommunications |
| HS | High Speed |
| HW | Hardware |
| MAG | Magnitude Approximation Device |
| MUX | Multiplexer |
| PDP | Power Delay Profile |
| PSTN | Public Switched Telephone Network |
| RACH | Random Access Channel |
| RNC | Radio Network Controller |
| RRC | Radio Resource Control |
| SIR | Signal To Interference Ratio |
| SW | Software |
| TDD | Time-Division Duplex |
| TS | Time Slot |
| TTI | Transmission Time Interval |
| Tx | Transmission |
| UE | User Equipment |
| UL | Uplink |
| UMTS | Universal Mobile Telecommunication System |
| UTRA TDD | UMTS terrestrial radio access time division duplex |
| UTRAN | UMTS terrestrial radio access network |
| VC | Vector Correlator |
| WTRUs | Wireless Transmit Receive Units |

DETAILED DESCRIPTION OF THE PREFERRED EMBODIMENT(S)

The present invention is described with reference to the drawing figures wherein like numerals represent like elements throughout. The terms base station, wireless transmit/receive unit (WTRU) and mobile unit are used in their general sense. The term base station as used herein includes, but is not limited to, a base station, Node-B, site controller, access point, or other interfacing device in a wireless environment that provides WTRUs with wireless access to a network with which the base station is associated.

The term WTRU as used herein includes, but is not limited to, user equipment (UE), mobile station, fixed or mobile subscriber unit, pager, base station or any other type of device capable of operating in a wireless environment. WTRUs include personal communication devices, such as phones, video phones, and Internet ready phones that have network connections. In addition, WTRUs include portable personal computing devices, such as PDAs and notebook computers with wireless modems that have similar network capabilities. WTRUs that are portable or can otherwise change location are referred to as mobile units.

The present invention is particularly useful when used in conjunction with base stations that receive wireless communications from multiple WTRUs, but has broad applicability for WTRUs in general for the detection of known sequences. For example, the invention can be implemented in either UEs or Node Bs of the conventional UTMS system illustrated in FIG. 1 and has particular usefulness for Node B base stations conducting path searching or common uplink physical channel detection of, for example, FDD RACH or CPCH preambles transmitted with the format specified by 3GPP TS 25.211 Section 5.2.2.

Figure 8:
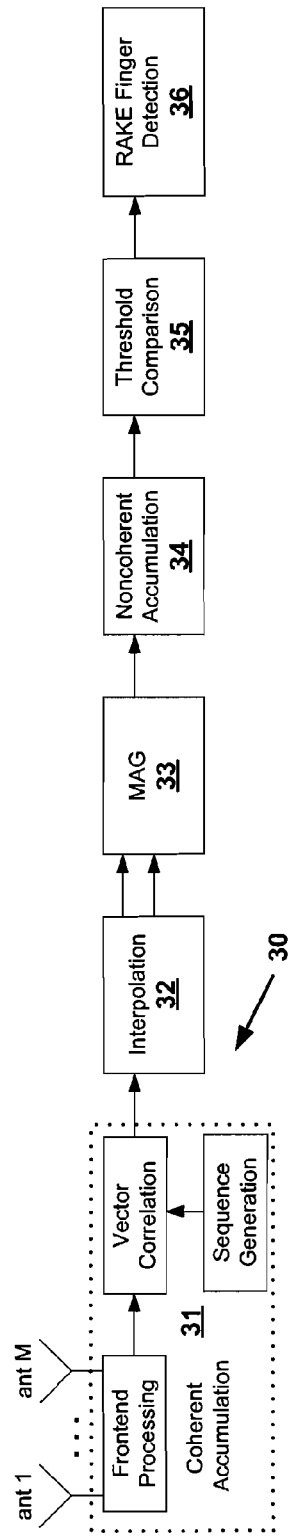
FIG. 8 is a block diagram of a sequence detection system for a wireless receiver made in accordance with the present invention.
Figure 2:
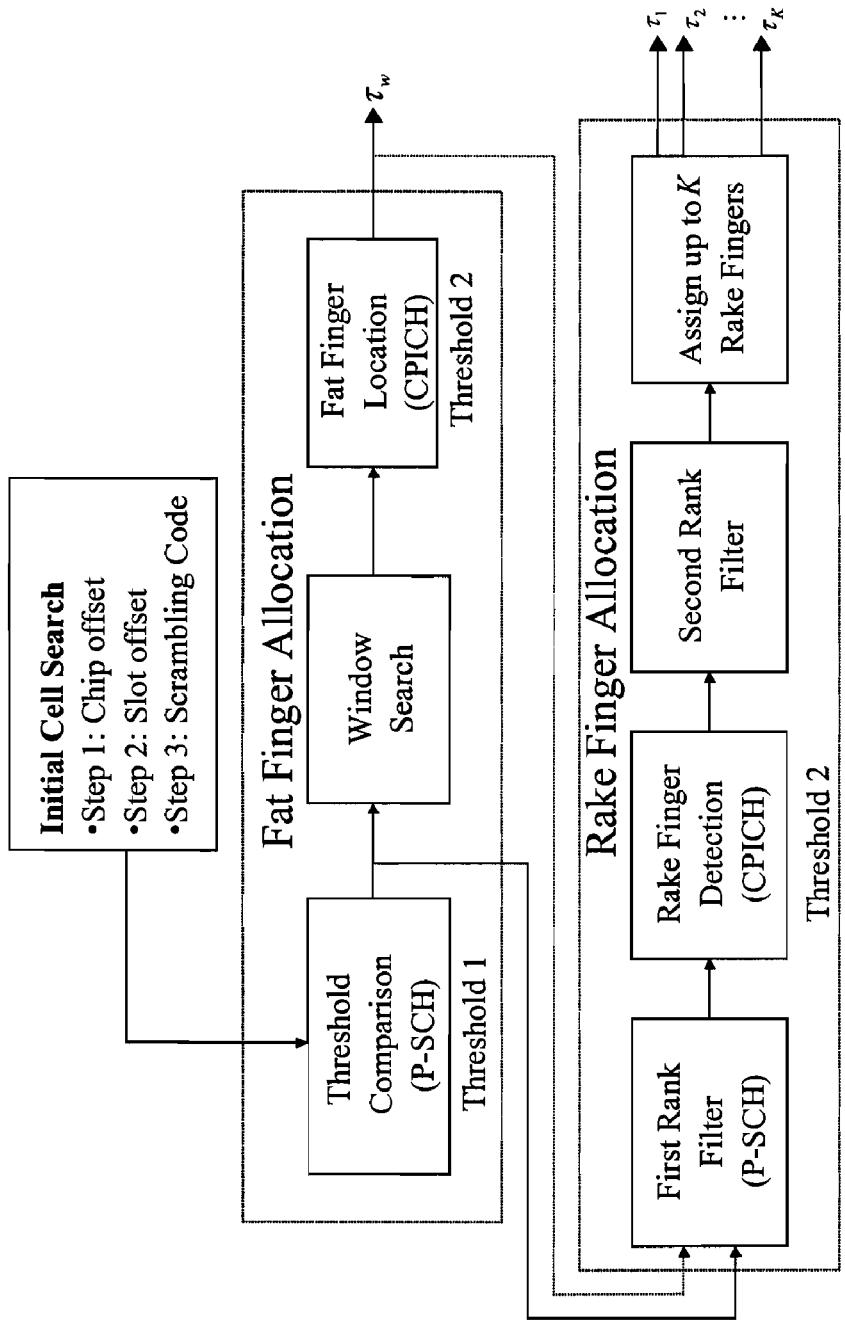
FIG. 2 is a block diagram of an initial Fat finger and RAKE finger allocation processors of a RAKE receiver.
Figure 3:
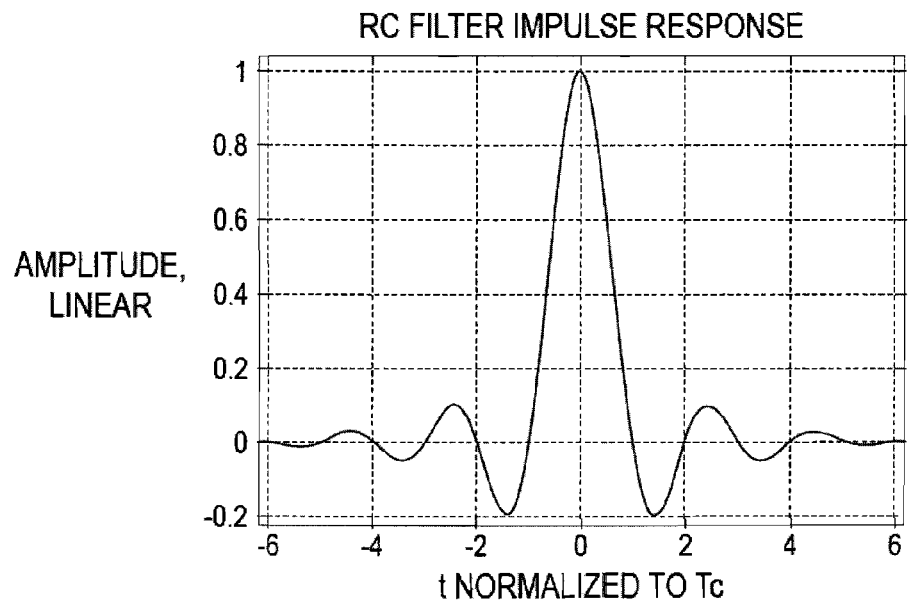
FIG. 3 is a graph of an impulse response in time domain of an RC filter with a roll-off factor of 0.22.
Figure 4:
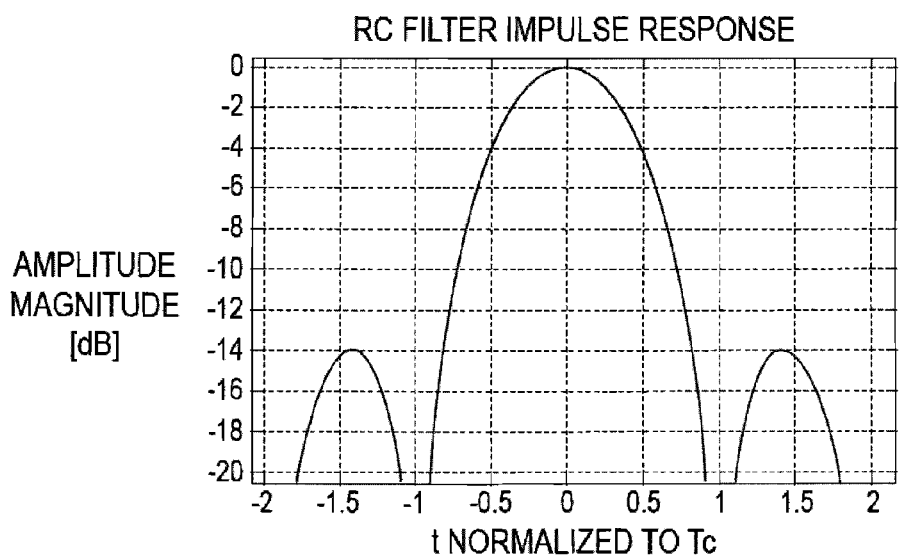
FIG. 4 is the amplitude magnitudes in dB of the filter of FIG. 3.
Figure 5:
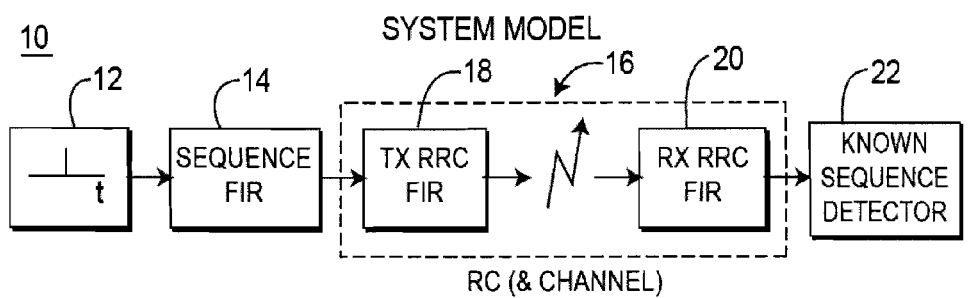
FIG. 5 is a block diagram of a system for achieving timing synchronization.
Figure 6:
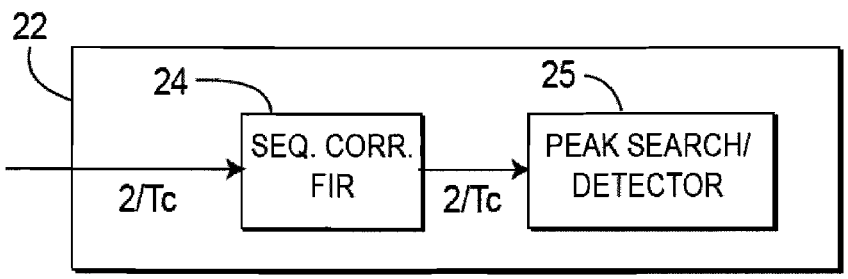
FIG. 6 is a block diagram of a sequence detector that uses a "brute force" technique for sequence detection for the system of FIG. 5.

Referring to FIG. 8, there is shown a Vector Correlator (VC) based architecture 30 for sequence detection in accordance with the present invention. When a communication is initiated, the exact time when a transmitted signal sequence reaches a receiver is not known and can subsequently vary because of the velocity of a mobile WTRU, oscillator uncertainty and position within a cell service area. The received signal quite often includes more than one copy of a transmitted signal received at slightly different times since the radio waves reaching the receiver's antenna(s) take different paths. A RAKE receiver is conventionally used to combine these copies of received signals to enhance reception capability. Therefore, the base station searches within a certain time window for the arrival of an expected sequence. Generally, a search window is selected of a desired size, such as L chips in length, where L is selected to be long enough to capture an initial copy of a signal as well as multipath copies.

Conventionally, front end processing of the received signals is performed by RF, mixed signal and baseband filtering of signal samples. In the present invention, wireless communication signals are received via one or more antennas ant 1 . . . ant M. The received signals are preprocessed by sampling at a selected rate. As in the preferred embodiments disclosed in Publication No. US-2003-0161416, to avoid relatively expensive over sampling, sampling is preferably conducted at the chip rate 1/Tc specified for system transmissions.

After preprocessing the samples can then be correlated to a known sequence code, i.e. coherent accumulation. For some 3GPP system transmissions, for example, correlation is a function of both a sequence/signature code of a known length and a scrambling code. The known transmitted sequence is often made up of repetitions of a shorter sequence or signature. For example, currently a 3GPP FDD RACH preamble is specified as 4096 chips in length consisting of 256 repetitions of a 16 bit signature code. There are presently sixteen different signature codes specified for RACH preamble transmissions, so that one of those 16 bit signatures is selected to create the entire RACH preamble for encoding with a spreading code for a specific transmission. Sixteen spreading codes are normally allotted for each cell of a 3GPP system, but different cells may use different groups of spreading codes.

In a static case, the estimates of the samples can be integrated over a complete sequence ending up with a maximum increased signal-to-noise ratio (SNR). However that is generally only feasible if the transmitting and receiving VVTRUs move relative to each other with only low velocity. If the frequency offset caused by Doppler Effect of up to 250 km/h movement is taken into account, coherent combining of an entire sequence will typically not function properly. This is one example of a case where it is desirable to partition an overall sequence into smaller equal packages that can be combined noncoherently, Noncoherent Accumulation. For RACH preamble detection, a segment length of 1024 chips is preferably selected where each segment represents 64 repetitions of the transmitted 16 bit signature code.

In accordance with the present invention, a coherent accumulation unit 31 is provided which includes selection of sample streams of received signals from selected antenna sources which are correlated with known sequences produced by a sequence generator. The sample streams and known sequences are correlated in a vector correlator array to produce Power Delay Profiles (PDPs). As explained in detail below, the vector correlator array hardware of the coherent accumulation unit 31 is very adaptable to produce PDPs under varied sets of parameters. Preferably, an antenna selection unit is included separately for each Vector Correlator to enable exploitation RX diversity over multiple antennas. Although generally chip alignment of the samples of the same transmitted signal received on different antennas can be maintained, there may be a significant phase differential that enhances or lessens the quality of the received signal samples for RX processing.

Figure 7:
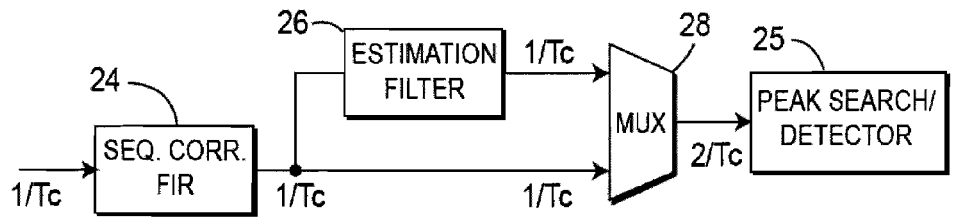
FIG. 7 is a block diagram an alternative sequence detector that does not use a "brute force" technique for sequence detection for the system of FIG. 5.

The PDPs produced by the coherent accumulation unit 31 are passed to an Interpolator 32 to increase the chip rate processing by interpolation. Preferably, this is accomplished as described in Publication No. US-2003-0161416 by using an estimation filter 26 as illustrated in FIG. 7 to double the chip length which in turn doubles the length of the PDPs.

The expanded PDPs are preferably then passed to a Magnitude Approximation device 33 (MAG) to approximate the magnitude of the accumulated samples of each PDP element. Typical with sampling in systems such as those specified by 3GPP, each sample will have at least an in-phase (I) and a quadrature (Q) component. The resultant PDP elements after coherent accumulation retain I and Q components. The magnitude approximation performed by the MAG 33 is preferably performed using the conventional max(I,Q)+0.5 min(I,Q) formulation.

A Noncoherent Accumulation Unit 34 receives the magnitude approximation values of the PDP elements and stores them, either in their original order or with position information. When complete sets of magnitude approximation values of PDP profiles are available, they can be passed through a Threshold comparison unit 35 which in turn preferably passes threshold qualified magnitude approximation and position values to a finger determination component of a RAKE receiver. The PDP elements which have sufficient magnitude generally represent the location of the start of at least one copy of a known transmitted sequence in the received wireless signal.

The detected peaks and their positions within the profile are delivered to RAKE receiver software that preferably starts with a task called 'Fat Finger Detection'. This means that peaks located very close together are not treated as two separated peaks but are united into one peak to avoid problems e.g. in assigning Rake fingers. Fat Finger Detection software is preferred for both RACH preamble and Path Search sequence detection.

Figure 9:
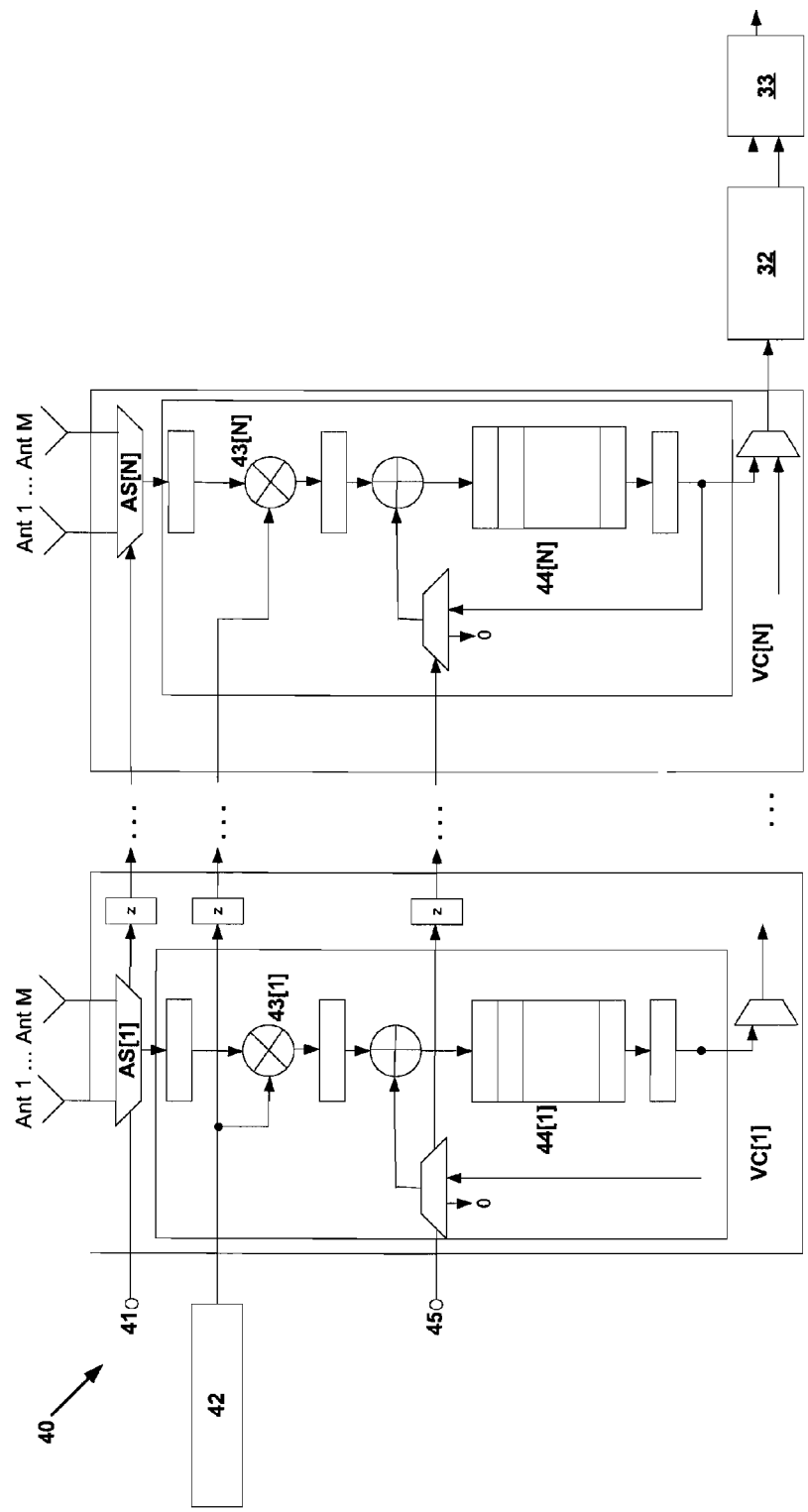
FIG. 9 is an expanded block diagram of a portion of the sequence detection system illustrated in FIG. 8 illustrating a vector correlator implementation of coherent accumulation.

FIG. 9 illustrates a general preferred configuration of a coherent accumulation unit 40. The coherent accumulation unit 40 includes an array of associated vector correlators VC[1]...VC[N]. In a simple case, each VC unit produces one value of the PDP for a certain WTRU. The maximum number of WTRUs that can be processed in parallel and the length of the PDP determine the hardware complexity. As explained below, hardware processing speed can be advantageously utilized to produce multiple values with each VC unit to permit a PDP's length to be greater than the number of VC units.

Although a single antenna can be used, where multiple antennas Ant 1 ... Ant M are provided, each vector correlator VC[1] ... VC[N] preferably includes a respective antenna switch AS[1] ... AS[N] which selects a sample stream from among the antennas for processing. The coherent accumulation unit 40 includes an input 41 for antenna switch control through which a control signal is sent to the antenna switches AS[1] ... AS[N] to switch processing input to a selected antenna's samples. Typically a control signal is sent at the start of an accumulation. Preferably the unit 40 is configured such that the control signal from input 41 is directed to the antenna switch AS[1] of the first vector correlator VC[1] which is then cascaded sequentially to each subsequent antenna switch AS[i], i=2 to N, of the respective vector correlator VC[i] with a specified delay, preferably one chip in length. Accordingly, each vector correlator VC[i] preferably commences sequence correlation with the ith sample relative to the first sample with which the first vector correlator VC[1] commenced sequence correlation. To implement the delayed cascading control signal to each subsequent antenna switch AS[i], a delay device z is associated with each preceding antenna switch AS[i−1], such as illustrated for the antenna switch AS[1] of the first vector correlator VC[1].

A sequence generator 42 is provided that generates a known sequence with which the sample stream from the selected antenna is correlated in each vector correlator. The sequence generator is preferably coupled with the vector correlators VC[1] ... VC[N] via respective mixers 43[1] ... 43[N] to serially mix the generated known sequence with the mixed samples accumulated in respective accumulation devices 44[1]... 44[N] which in turn each produce an accumulated element of the PDP being produced. The respective series of samples are mixed with the generated sequence such that the first generated element is mixed in each vector correlator VC [i] with the ith sample relative to the first sample with which the first vector correlator VC[1] commenced sequence correlation, i.e. the first generated element is mixed with the first sample in the first vector correlator VC[1] and with the Nth sample in the last vector correlator VC[N]. To implement the delay of generated sequence elements to each subsequent VC[i], a delay device z is associated with the generated sequence element path in each preceding vector correlator VC[i−1], such as illustrated for the generated sequence element path in the vector correlator VC[1].

A control input 45 is associated with accumulation devices 44[1] . . . 44[N] of the respective vector correlators VC[1] . . . VC[N] to signal the end of an accumulation at a selected number of samples p to trigger the output of the respective PDP element by the respective VC. A corresponding one chip delay device cascades the control signal to each subsequent VC[i].

By utilizing hardware devices in the coherent accumulation unit 40 which operate at a clock speed greater than the sampling rate, the vector correlators can be used multiple times to produce PDPs having more than N elements. For example, if the hardware devices in the coherent accumulation unit 40 operate at a rate 2/Tc that is twice the sampling rate 1/Tc, the sequence generator 42 can be configured to output a first copy of a known sequence with respect to every odd element sequentially produced and then a second copy of that known sequence with respect to every even element sequentially produced after a delay of N even elements. Thus the first, third and fifth elements outputted from the sequence generator would correspond to the first, second and third elements of the first copy of the known sequence and the 2Nth+2, 2Nth+4 and 2Nth+6 elements output from the sequence generator would correspond to the first, second and third elements of the second copy of the known sequence.

In such a case, each sample received from the respective selected antenna at a rate of 1/Tc is fed twice to the respective mixers 43[1] . . . 43[N] operating at 2/Tc and the accumulator devices 44[1] . . . 44[N] track mixings with even and odd generated elements, respectively, with the accumulator devices tracking the even mixings after a delay of 2N generated elements. Where p samples are accumulated for each PDP element, the first vector correlator VC[1] can then process the first p+N samples from a first antenna to produce the first and Nth+1 elements of a PDP. The first PDP element being the first p odd accumulated mixed samples, namely odd mixed samples 1, 3, 5 . . . to 2p+1, and N+1 PDP element being the even accumulated samples from 2N+2 through 2N+2p.

Alternatively, for such a case where the hardware operates at 2/Tc to process 1/Tc received samples, the sequence generator can generate two copies of the same sequence or two different sequences, where one copy or sequence is generated for odd generated elements and the other copy or different sequence is generated for even generated elements.

In the first case, where two copies of the same sequence are generated, the antenna selectors AS[1] . . . AS[N] can provide alternate copies of the each sample from two different antennas so that the VCs process the samples from one antenna with the odd generated sequence elements to produce a PDP of that antenna's sampled signals and the VCs process the samples from other antennas with the even generated sequence elements to produce a second PDP of the other antenna's sampled signals.

In the second case, where two different sequences are generated, two copies of each sample can be processed by the VCs to produce a first PDP based on samples mixed with the odd generated sequence elements that define the first known sequence and to concurrently produce a second PDP based on samples mixed with the even generated sequence elements that define the second different known sequence. In this way PDPs from signals transmitted from two different WTRUs can be concurrently generated; one WTRU that transmitted its signals encoded with the first known sequence and the other WTRU that transmitted its signals encoded with the second known sequence.

More complete examples can be considered for a better understanding of the functionality of the coherent accumulation unit 40. Table 1 identifies parameters used for functionality and size in the construction of the Coherent Accumulation unit.

TABLE 1

Parameters For Coherent Accumulation

| | |
|---|---|
| L | Length of search window. |
| K | Number of processed delay profiles. |
| N | Number of Vector Correlator units. |
| M | Number of Antennas. |
| c | Hardware clock = c * system frequency = c * (Typical value = 3.84 MHz) |
| p | Length of coherent accumulation. |
| u | Number of different sequences searched. (FDD RACH: number of scrambling codes; Path Search: number of WTRUs.) |

For simplicity, the following two examples are based on the case of only one antenna. In such case, the antenna switches always selects the same antenna or can be eliminated altogether. For the first example, the hardware is configured for N=10, L=10, M=1, c=1, u=1, p=1024. The coherent accumulation unit 40 can then include ten VC units VC[1]-VC[10] running at 1× to produce one delay profile of length ten for one active WTRU. After 1024 chips are processed, the first VC unit VC[1] produces the first delay profile value and after 1024+9 chips are processed, the last VC unit VC[10] produces the last delay profile value and the PDP is completed.

In a second example, the hardware is configured for N=10, L=20, M=1, c=2, u=1, p=1024 The coherent accumulation unit 40 can then also include ten VC units VC[1]-VC[10], but running at 2×, to produce one delay profile of length 20 for one active WTRU. To perform this, two copies of the sequence code are queued into the VCs. This can be accomplished, for example, as discussed above where the first copy is fed into the first VC unit VC[1] with the odd generated elements, i.e. first, third, fifth, etc. generated elements, and the second copy is fed with a delay of twenty, i.e.(2*N), elements into the first VC unit VC[1] on the even generated elements, i.e. twenty second, twenty fourth, twenty sixth, etc. generated elements. The first VC unit VC[1] then produces the first PDP value after processing the 1024th sample with the 2047th generated element and produces the eleventh PDP value after processing the 1034th sample with the 2068th generated element. Similarly, the last VC unit VC[10] then produces the tenth PDP value after processing the 1033rd sample with the 2047th generated element and produces the twentieth PDP value after processing the 1043rd sample with the 2068th generated element to complete the PDP of length 20. Thus, ten hardware VC units running at 2× are used to define twenty virtual VC units running at 1×.

The number of the virtual VC units determines the maximum length of a possible delay profile. In UMTS FDD this is equivalent to the maximum cell radius that can be processed by the coherent accumulation block. The number of the virtual VC units offered by the hardware is the product of c*N. The number of system required virtual VC units is the product of L*u.

Preferably, for Path Search, the coherent accumulation unit 40 is configured with 100 vector correlators VC[1] . . . VC[100] and operates at 48/Tc to process received signals sampled at 1/Tc. Preferably, the sequence generator is then configured to generate sequences based on 48 different scrambling codes in order to concurrently search for sequences transmitted by up to 48 different VVTRUs each using different scrambling codes. To accomplish this, the sequence generator can be configured such that the first element of each different generated sequence is generated followed by each respective sequential element of all the known sequences before the next sequential element of any of the known sequences is generated. This permits, for example, the first VC unit VC[1] to process the first signal sample with the first element of each of the 48 known sequences and to process the ith signal sample with the ith element of each of the 48 known sequences to produce the first value of 48 PDPs, each corresponding to the processing of the received signal with a different one of the 48 scrambling codes. In this case, the length of each PDP is 100.

The same hardware configuration can be controlled to produce PDPs of length 200 where each VC produces two values. This reduces the number of PDPs that can be concurrently produced from 48 to 24.

In another example configuration, the coherent accumulation unit 40 is configured with 64 vector correlators VC[1] . . . VC[64] and operates at 48/Tc to process received signals sampled at 1/Tc. For operation, the coherent accumulation unit 40 is controlled based on cell size per, for example the following:

where the cell radius is 40 km for a desired search window of 1024 chips, the sequence generator is then configured to generate sequences based on 3 scrambling codes in order to concurrently produce PDPs of length 1024;

where the cell radius is 20 km for a desired search window of 512 chips, the sequence generator is then configured to generate sequences based on 6 scrambling codes in order to concurrently produce PDPs of length 512;

where the cell radius is 10 km for a desired search window of 256 chips, the sequence generator is then configured to generate sequences based on 12 scrambling codes in order to concurrently produce PDPs of length 256;

where the cell radius is 5 km for a desired search window of 128 chips, the sequence generator is then configured to generate sequences based on 24 scrambling codes in order to concurrently produce PDPs of length 128;

where the cell radius is 2.5 km for a desired search window of 64 chips, the sequence generator is then configured to generate sequences based on 48 scrambling codes in order to concurrently produce PDPs of length 64.

The coherent accumulation unit 40 is particularly useful for wireless system base stations where it is often desirable to detect sequences from multiple concurrent wireless signals. Additionally, the coherent accumulation unit 40 is very useful for single user WTRUs such as for detecting multipath signals for path search with respect to a communication signal received from a base station or other WTRU.

Figure 10:
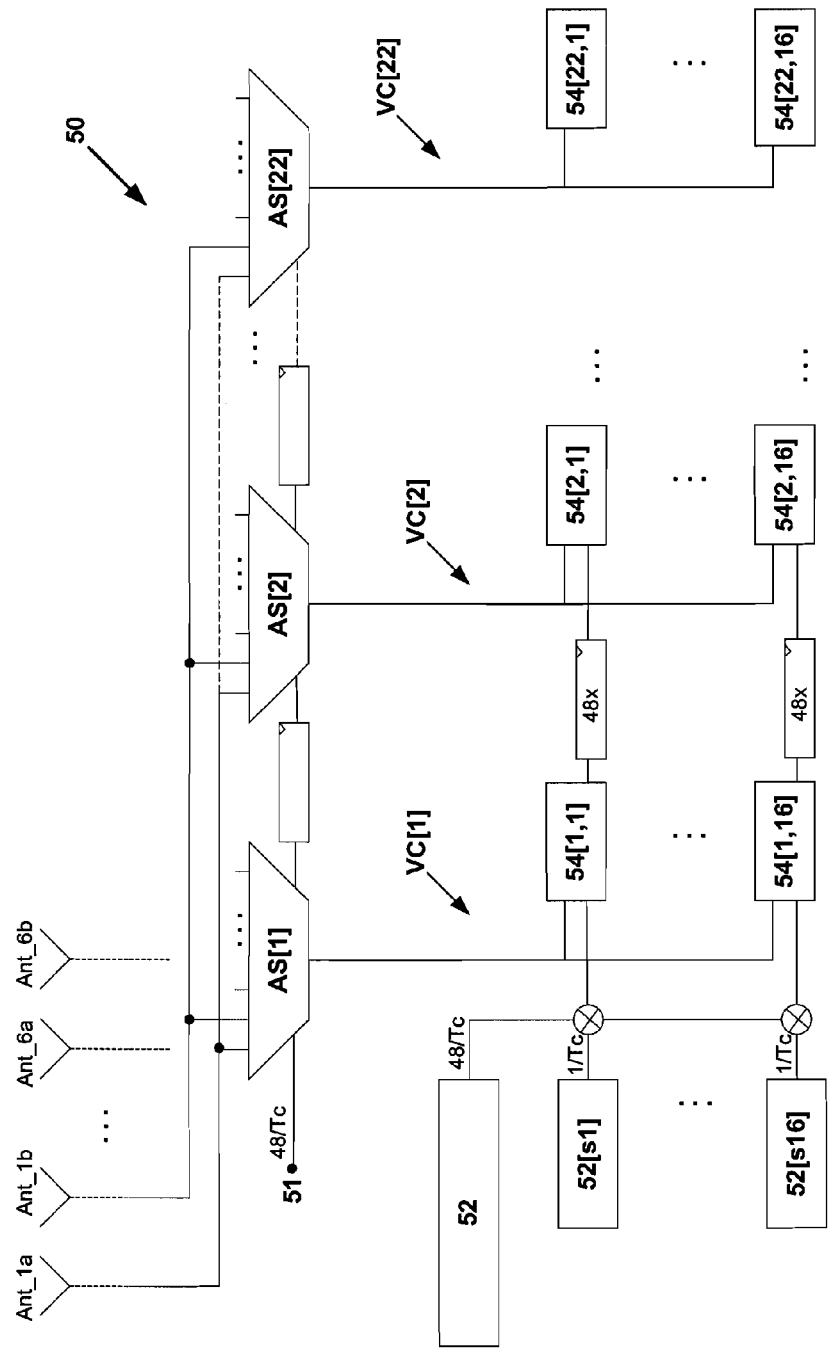
FIG. 10 is a further expanded block diagram of a portion of the sequence detection system illustrated in FIG. 8 illustrating an implementation of coherent accumulation for detecting a RACH preamble for a base station of a 3GPP wireless communication system.

FIG. 10 illustrates a preferred example of a coherent accumulation unit 50 configured for 3GPP FDD RACH preamble detection by a base station with twenty-two vector correlators VC[1]-VC[22] that operates at 48/Tc to process received signals sampled at 1/Tc. As explained above, this permits a variety of PDPs that have a length which is a multiple of 22 to be readily produced. The coherent accumulation unit 50 is preferably configured to produce PDPs with a length in accordance with the cell size serviced by the base station based on the parameters set forth in the Table 2. Accordingly, where for example the PDP size is selected as 88, each of the VCs produce four elements of each PDP.

TABLE 2

Preferred 3GPP FDD RACH PDP lengths

| Distance (km) | Profile Length | Anti/Code Comb. |
| --- | --- | --- |
| .086 | 22 | 48 |
| 1.72 | 44 | 24 |
| 3.44 | 88 | 12 |
| 6.87 | 176 | 6 |
| 13.75 | 352 | 3 |
| 41.25 | 1056 | 1 |

As with the general embodiment illustrated in FIG. 9, each vector correlator VC[i] has an associated antenna switch AS[i] and, with the exception of the first VC unit VC[1], operates with a one chip delay with respect to each respective predecessor VC unit VC[i−1]. The coherent accumulation unit 50 similarly includes an input 51 for antenna switch control signals operates with a one chip delay with respect to the respective antenna switches. In the coherent accumulation unit 50, each vector correlator is modified to contain a number of accumulator devices equivalent to the number of signature codes available. In the case of current FDD RACH specifications, sixteen signature codes are available, so each vector correlator VC[i] preferably includes sixteen accumulator devices 54[i,1]-54[i,16], respectively.

A sequence generator 52 for generating RACH scrambling codes is provided. The sequence generator 52 is associated with each of sixteen signature code generators 52[s1]-52[s16]. Preferably, each signature code generator 52[sj] repeatedly generates one of the sixteen specified 16 bit signatures used to form the 16 different RACH preambles that are permitted. The output of each signature code generator 52[sj] is mixed with one or more scrambling sequences generated by the sequence generator 52 to provide the known sequence elements to a respective accumulator device 54[1,j] of the first vector correlator VC[1] and is then cascaded with a chip delay to the corresponding accumulator device 54[i, j] of each subsequent vector correlator VC[i].

Where the PDP length is set at 22, the sequence generator 52 can advantageously be configured to generate 48 RACH scrambling codes. Although currently 3GPP specifications designate sixteen scrambling codes be available for a FDD RACH preamble transmission, different sets of scrambling codes for different cells can be provided. Accordingly, the capacity to generated 48 different scrambling codes, enables a base station to detect all signature/scrambling code combinations for FDD RACH preambles concurrently for three different cells within a 3GPP system where different scrambling code sets are used within each different cell.

In such a case, the mixing with a "jth" signature generated by the respective signature code generator 52[sj] passes 48 differently scrambled copies of the jth signature sequence to the respective accumulator device 54[1j] of the first vector correlator VC[1] which generates the first PDP element of 48 PDPs, each corresponding to a differently scrambled version of the jth signature sequence. A respective set of 48 PDPs is generated for each of the sixteen different RACH signature code preambles. Accordingly, in such a configuration, the coherent accumulation unit 50 will detect a RACH preamble transmitted in the observed window for any WTRU RACH preamble transmission based on any of the 48 scrambling codes in combination with any of the 16 permitted signature sequences.

Using j for signature code and i for scrambling code to denote the produced PDPs as PDP[j,i], if the PDP identified by PDP[12,17] contains non-noise values, PDP[12, 17] then reflects reception of a RACH preamble transmitted by a WTRU using the 12th specified signature sequence and the 17th scrambling code. If only a small number of WTRUs are transmitting RACH preambles, only a small number of the produced PDPs will contain non-noise values, those being the PDPs corresponding to signature/scrambling code combinations used by the transmitting WTRUs.

Preferably the coherent accumulation unit 50 receives signal samples from one or more pairs of antennas such as pair Ant_1a, Ant_1b through Ant_6a, Ant_6b as illustrated in FIG. 10. Since RACH preambles consist of repetitive segments, the coherent accumulation unit 50 can be configured to produce PDPs for RACH preamble segments instead of PDPs for entire preamble sequences.

Figure 15:
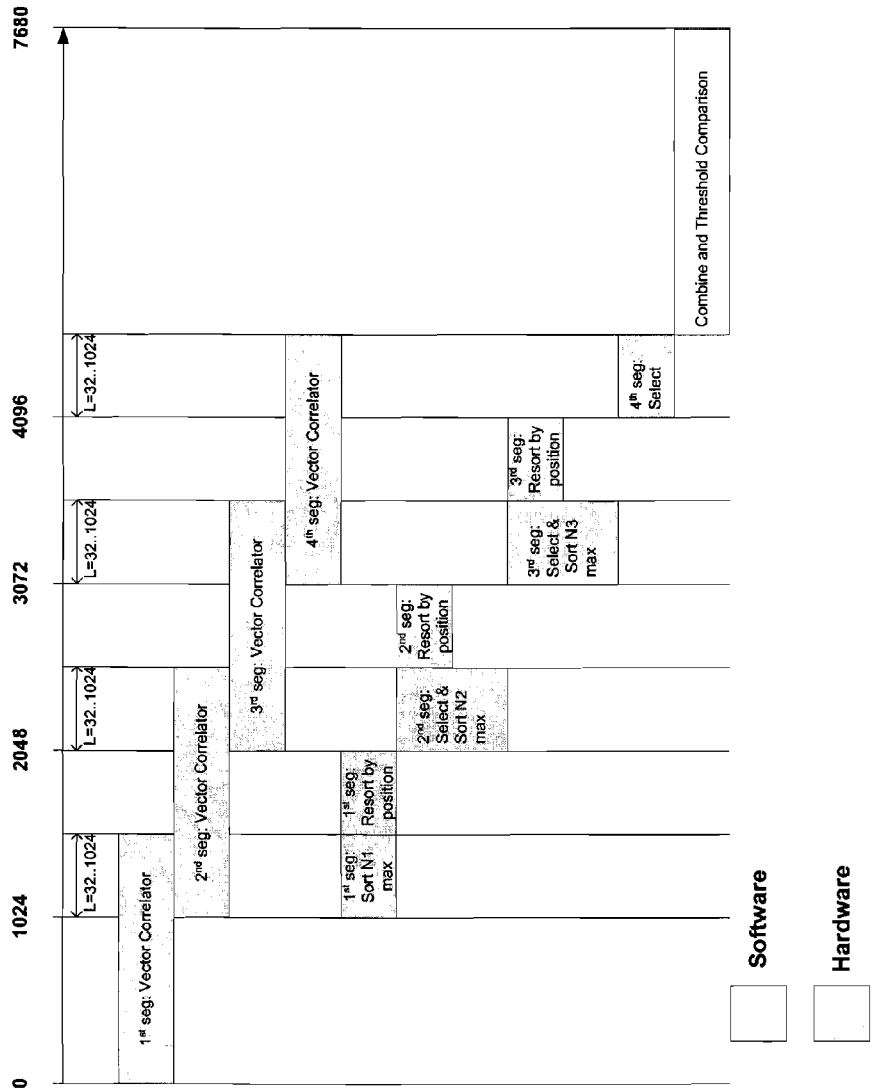
FIG. 15 is a processing diagram of timing scheduling for the sequence detection system for implementing the sorting process in FIG. 14.

The configuration for the coherent accumulation unit 50 can be based on dividing 4096 chip RACH preambles into four 1024 chip segments for coherent accumulation while exploiting antenna diversity. In such a case, one preferred example is to switch the antenna signal sample source for each segment between signals received from two antennas of an antenna pair in producing length 22 PDPs. Accordingly, antenna Ant_1a can provide the first 1024 samples to VC[1.] to produce the first PDP values of the PDPs corresponding to each of the signature/scrambling code combinations for the first RACH preamble segment. The antenna switch AS[1] then switches to antenna Ant_1b to provide the samples 1025 through 2048 to VC[1] to produce the first PDP values of the PDPs corresponding to each of the signature/scrambling code combinations for the second RACH preamble segment. The antenna switch AS[1] then switches back to antenna Ant_1a to provide the samples 2049 through 3072 to VC[1] to produce the first PDP values of the PDPs corresponding to each of the signature/scrambling code combinations for the third RACH preamble segment. The antenna switch AS[1] finally switches back to antenna Ant_1a to provide the samples 3073 through 4096 to VC[1] to produce the first PDP values of the PDPs corresponding to each of the signature/scrambling code combinations for the fourth RACH preamble segment. The antenna switching is delayed one chip for each subsequent VC so that VC[22] processes signal chips 22 to 1043 and 2070 to 3091 from antenna Ant_1a and chips 1044 to 2069 and 3092 to 4115 from antenna Ant_1b/ to produce the last PDP values of PDPs corresponding to each of the signature/scrambling code combinations for the four RACH preamble segments. FIG. 15 reflects a timeline for such VC processing, L being equal to 22 in the above example.

After PDP values are produced by the coherent accumulation unit, they are preferably passed to the interpolator 32 which in turn passes interpolated values with the original PDP values to the MAG 33. Although the coherent accumulation over p samples generally takes p chips of time to produce each PDP value, the values are outputted from the coherent accumulation unit for each PDP at the rate of the delay in processing by each successive VC. As explained above, that delay is preferably one chip so that the PDP values for each PDP are produced at a 1/Tc rate. Accordingly, the interpolator 32 preferably doubles the chip rate for each PDP to 2/Tc when providing the interpolated values which define an expanded PDP that is processed by the MAG 33.

Where multiple PDPs are concurrently produced, the interpolator can be configured to operate at a higher speed or multiple interpolators can be provided to process different ones of the PDPs concurrently produced. For example, where coherent accumulation unit 50 is configured to concurrently produce PDPs of length 22 for each of 16 signature code and 48 scrambling code combinations, sixteen interpolators can be provided, each operating to output expanded PDPs at a collective rate of 96/Tc for an overall effective output rate of 1536/Tc. To process such a collective output, the MAG 33 can be divided into thirty two MAG subunits each operating at 48/Tc to perform magnitude approximation of the values for the respective expanded PDPs produced via the interpolation unit 32.

Figure 11:
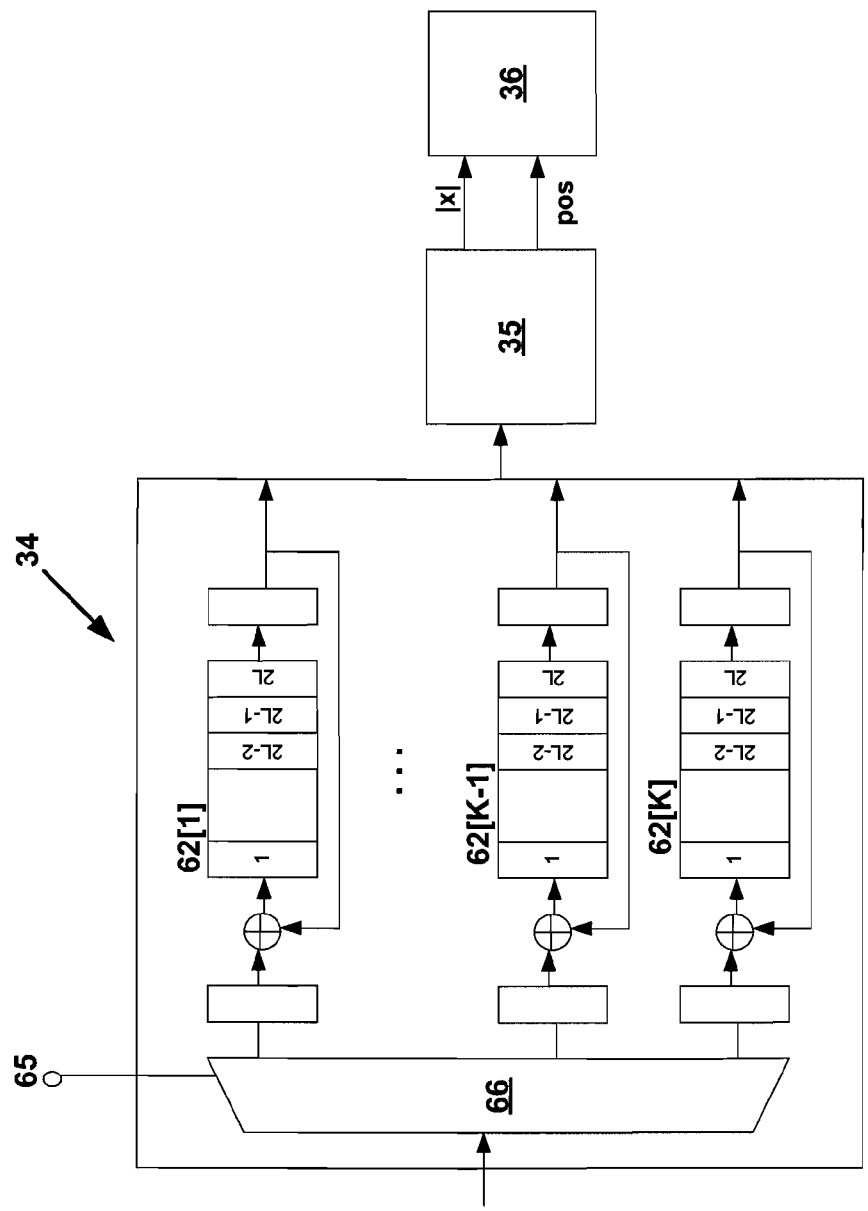
FIG. 11 is an expanded block diagram of a portion of the sequence detection system illustrated in FIG. 8 illustrating a vector correlator implementation of noncoherent accumulation.

In the preferred embodiment as illustrated in FIG. 8, after magnitude approximation in the MAG 33, the values produced for each of the expanded PDPs are passed to the noncoherent accumulation unit 34. As best seen in FIG. 11, the noncoherent accumulation unit 34 preferably includes K round robin structures 62[1]-62[K] of length 2L so that each round robin structure can store an entire expanded set of magnitude approximation values for one PDP. A control input 65 is provided to control a de-multiplexing device 66 such that respective values of each respective expanded PDP set received from the MAG 33 are directed to a respective round robin structure 62[1]-62[K]. The respective sets of expanded PDP values are then directed from the round robin structures to the threshold comparison unit 35 which passes magnitude and position values of respective expanded PDPs to the RAKE finger detection unit 36 of a RAKE receiver. Preferably, only a selected number of highest values with their positions are passed through the threshold comparison unit 35 to the RAKE finger detection unit 36. This type of pure noncoherent processing does not impair SNR performance and is relatively inexpensive.

From time to time new PDPs may be produced. A control signal then chooses the respective round-robin structure to update the new PDP. For RACH Preamble Detection the number of round-robin structures is preferably fixed at 16*u. For Path Search, the number is selected based on whether the PDPs are to be delivered on a time frame basis or on a time slot basis, a time frame basis being preferred. The noncoherent accumulation unit 34 can be configured such that the output of the round robins is selectively controlled to combine related PDPs. For example, PDPs for different RACH segments of the same signature/scrambling code combination can be directed to threshold comparison unit 35 concurrent processing by the RAKE receiver. Similarly, where the sequence detection hardware is configured for Path Search on a time frame basis, the noncoherent accumulation unit 34 is preferably configured to permit PDP combinations segment wise for intra-slot combining and also PDP combinations slot-wise for inter-slot combining in addition to PDP combinations antenna-wise for antenna diversity combining. The same very simple structure of a pool of round-robin units permits such versatility of combinations since all of the relevant PDPs to be combined are readily accessible from the collection of round-robin units.

The size of the memory required for the round robins of the noncoherent accumulation unit 34 is a direct function of the number K of PDPs to be stored and the PDP size L. As K and L increase, the memory requirements can become prohibitive.

For RACH preamble detection, the preferred size of the memory is close to the border of acceptance, but the simplicity of the structure described above supports the viability of the configuration reflected in FIG. 11 for such an application. However, RACH preamble detection is not the only application for the sequence searcher.

For example, the current 3GPP specifications for the Common Packet Channel (CPCH) based on packet channel technology specifies the transmission of a preamble that is very similar to the preamble specified for the RACH. However, for the CPCH the number of possible scrambling codes is increased to 64. This in turn increases the necessary memory to implement the noncoherent accumulation unit 34 as illustrated in FIG. 11. In cases where such a simple configuration becomes memory prohibitive, it is preferred to implement algorithms that enable a reduction of that memory in the processing of produced PDPs.

Figure 12:
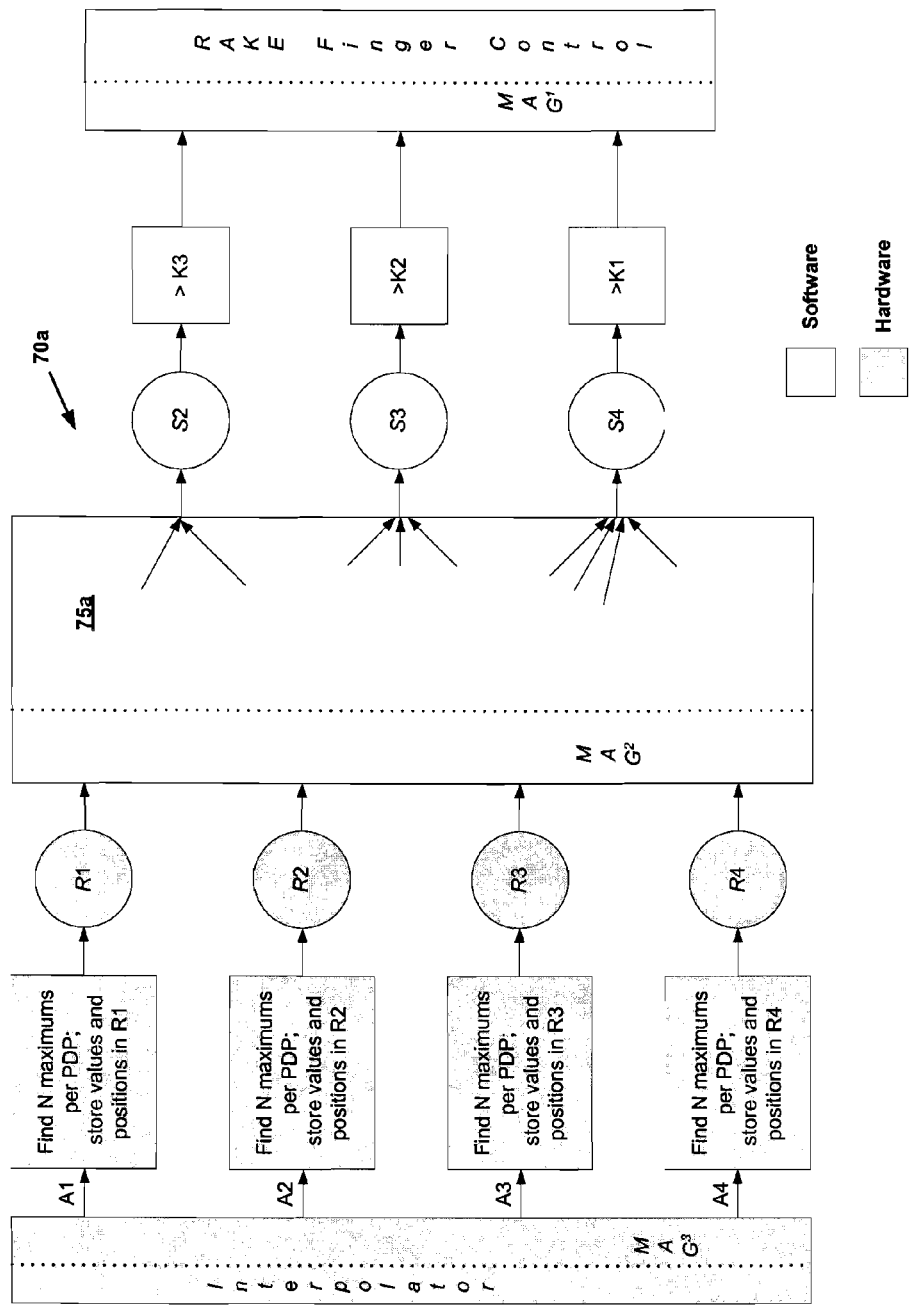
FIG. 12 is a processing diagram of preselection by maximum sorting per segment for the sequence detection system where the sequence to be detected is repetitive and can be divided into segments for detection analysis.
Figure 14:
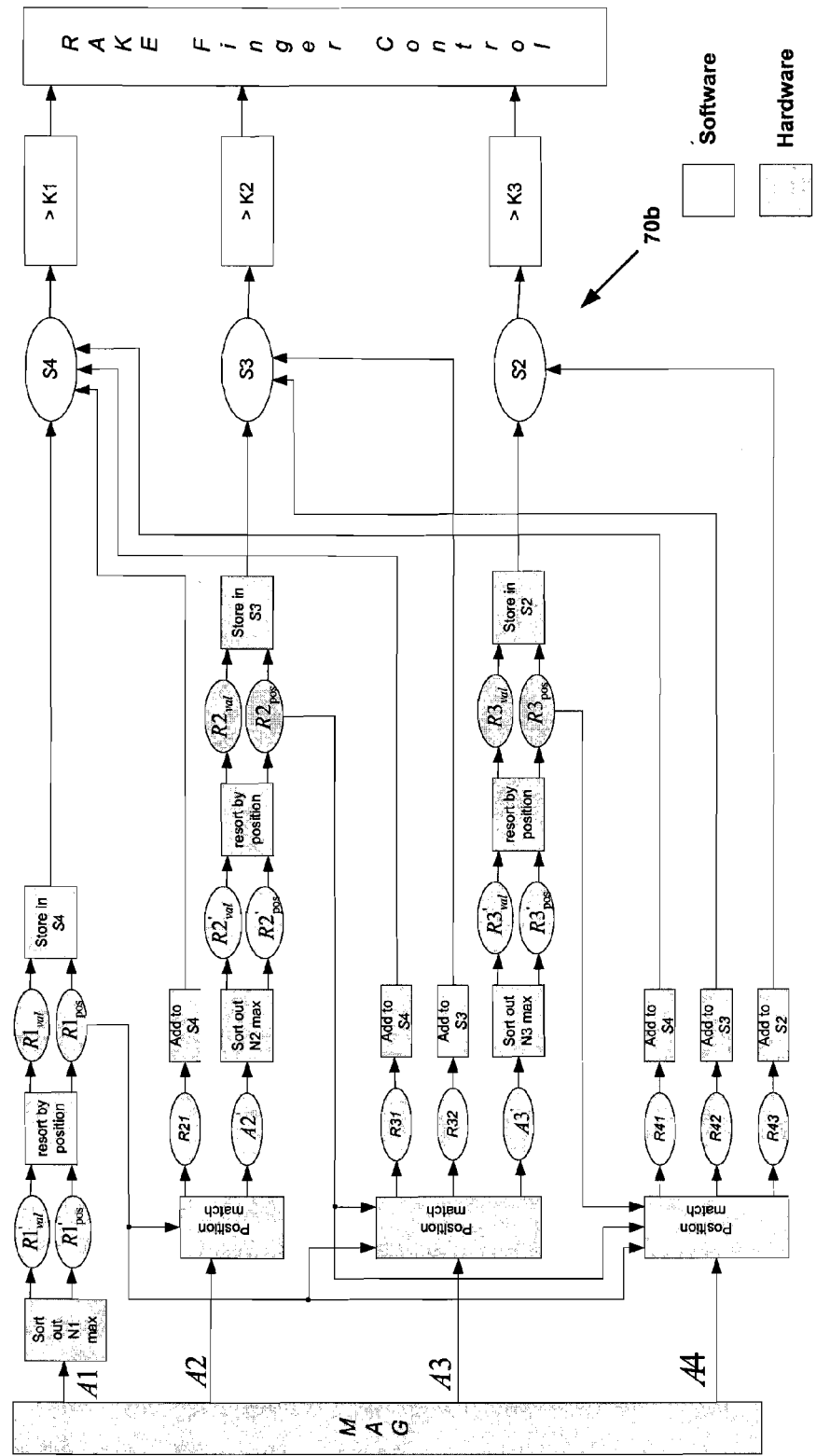
FIG. 14 is a processing diagram of preselection by sorting utilizing known maximum positions for the sequence detection system where the sequence to be detected is repetitive and can be divided into segments for detection analysis.
Figure 16:
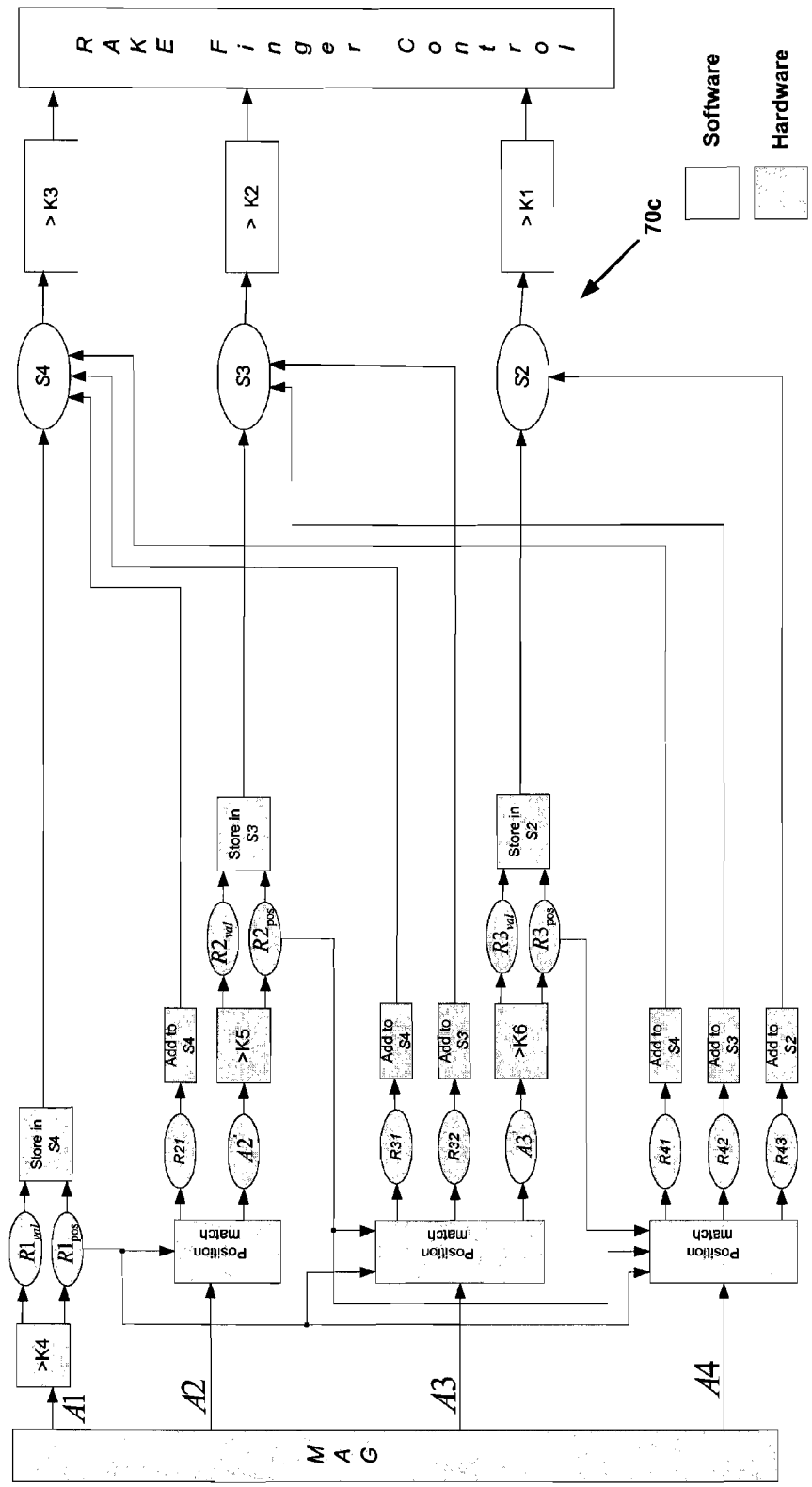
FIG. 16 is a processing diagram of preselection by threshold comparison using known positions for the sequence detection system where the sequence to be detected is repetitive and can be divided into segments for detection analysis.

FIGS. 12, 14, and 16 provide three alternatives that provide alternate processing in place of the noncoherent accumulation unit 34 illustrated in FIG. 11. For explanatory purposes, the three alternatives are described based on a RACH preamble with the length of 4096 chips, which is also used for the CPCH case, where the preamble is partitioned into 4 segments each of 1024 chips in length. PDP elements for each segment are produced by coherently combining chip samples over 1024 chips, i.e. p=1024, in a coherent accumulator unit such as unit 50 illustrated in FIG. 10. The produced PDPs that represent the four segments of a particular transmitted sequence are then combined coherently and/or noncoherently. The combining of the four segments is called post processing.

The alternatives to reduce the memory are based on preselection algorithms. The three different methods of post processing reflected in FIGS. 12, 14, and 16 can be characterized, respectively, as:

Preselection by maximum sorting;

Preselection by sorting utilizing known maximum positions; and

Preselection by threshold comparison using known positions.

For post processing preselection by sorting, a scalable sorter is preferably provided to implement these methods.

For the example of RACH preamble detection, a search is made over up to 48 scrambling codes, 16 signatures and a search window of length varying from 22 to 1024. The coherent accumulation unit can create large matrices $A_j$, j=1 to 4, of PDP values for each respective segment to consider all signature/scrambling code combinations. In lieu of providing the memory to store a complete set of values produced for the segment matrices Aj, j=1 to 4, in the round robin structures of the noncoherent accumulation unit 34, preselection can be advantageously employed. This is feasible since only very few elements of a limited number of PDP's profile will represent received preamble transmissions. The rest of the PDP values represent accumulated noise.

The combined PDPs are compared against thresholds. If a value is above a selected threshold a Preamble is considered detected as starting at the respective position of the PDP value within the PDP. The thresholds are preferably chosen such that to False Alarm and Missed Detection rate of $10^{-3}$ is reached. False alarm happens if a preamble is considered detected when no preamble was sent. Missed detection happens if a preamble is not detected when it was sent. The conventional thresholds employed for the threshold detector 35 serve as a reference with respect to False Alarm and Missed Detection rate for the preselection alternatives.

Preselection by Maximum Sorting

Referring to FIG. 12, an overall diagram of the process is provided from the production of the expanded PDPs with interpolated values, which increase the set size of the PDP values to 2L each, to the passing of threshold qualified PDP values and associated positions to the RAKE finger control of a RAKE receiver. A preferred distribution between hardware and software implementation of the various functions is indicated by the slight shading of the functions preferred to be implemented in hardware.

MAG functionality is optionally implemented in either hardware or software at one of the three illustrated locations, $MAG^1$, $MAG^2$, $MAG^3$, depending upon whether coherent and/or noncoherent combination of PDP values is desired. The combining of PDP values by adding their complex components prior to transformation into magnitude approximation values represents coherent combining such as when the MAG functions occur at position $MAG^1$. The combining of PDP values by adding their magnitude approximation values represents noncoherent combining such as when the MAG functions occur at position $MAG^3$. When the MAG functions occur at position $MAG^2$, both coherent and noncoherent combining can be implemented to pass both raw complex combined values and magnitude approximation values for each respective PDP position for threshold evaluation. In such case, preferably, if either the complex combined value or the magnitude approximation value exceeds a respective threshold, the magnitude approximation value and associated position data passes through the threshold comparison to the RAKE finger control.

Figure 13:
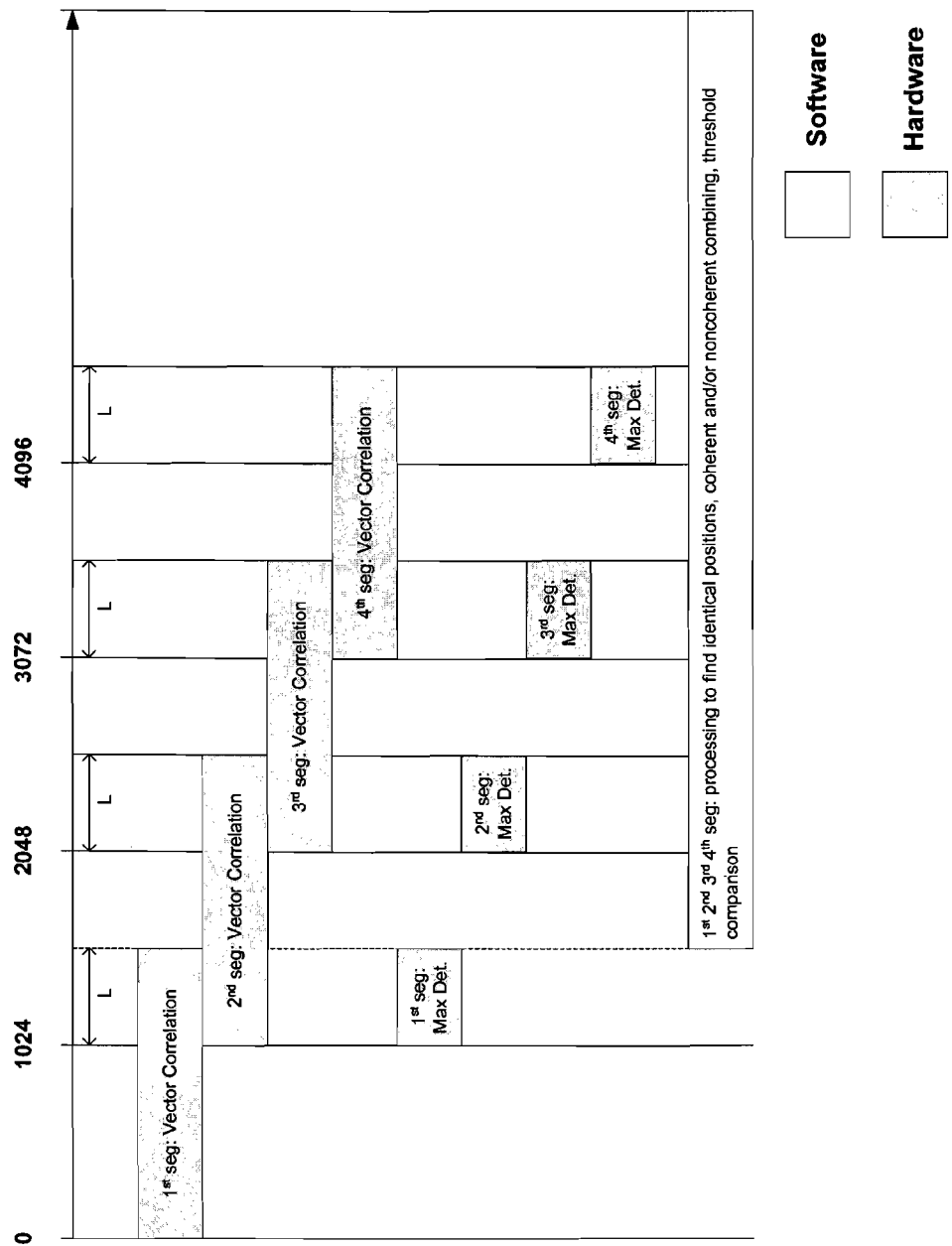
FIG. 13 is a processing diagram of timing scheduling for the sequence detection system for implementing the sorting process in FIG. 12.

Assuming the MAG functionality is located at $MAG^1$, the processing preselection by Maximum Sorting proceeds as set forth in FIG. 12 with the timing set forth in FIG. 13 as explained in the following paragraphs.

The first segment PDPs are generated and interpolated, represented by A1, and those values are passed through a sorting device to find N maximum values per PDP and to then store the N complex values and respective position values in a memory R1.

The second segment PDPs are generated and interpolated, represented by A2, starting concurrently with the sorting of the A1 values. The A2 values are passed through a sorting device to find N maximum values per PDP and to then store the N complex values and respective position values in a memory R2.

The third segment PDPs are generated and interpolated, represented by A3, starting concurrently with the sorting of the A2 values. The A3 values are passed through a sorting device to find N maximum values per PDP and to then store the N complex values and respective position values in a memory R3.

The fourth segment PDPs are generated and interpolated, represented by A4, starting concurrently with the sorting of the A3 values. The A4 values are passed through a sorting device to find N maximum values per PDP and to then store the N complex values and respective position values in a memory R4.

The number of elements per PDP processed above is intended to include additional elements created through interpolation and can be referred to as L'. Preferably interpolation doubles the number of elements per PDP so that for PDPs originally produced with L elements, L'=2*L. The number N of maximum values is always selected to less than half of L', but is preferably substantially less than that number. For example, where a search window is 1024 chips which results in L'=2048 due to doubling by interpolation, N is preferably 100 so that the highest 100 PDP values are selected from each PDP of A1, A2, A3 and A4.

Tables 3 and 4 provide representative hardware requirements for the scalable sorter and memories R1-R4 for implementing the above process.

TABLE 3

Sorter hardware
Sorter: Hardware in kgates

| | |
|---|---|
| 1 sorter | 2.443 |
| Overall Control | 10 |
| sum (16sig, 2 sorting-cycles, even/odd) | 2 * 2 * 16 * 2.443 + 10 = 166 |

TABLE 4

Sorter memory per segment
Sorter: Memory per segment in bits

| | |
|---|---|
| L = 64, N = 20, 16 bits/word, i/q/position | 20 * 3 * 16 * 48 * 16 = 737280 |

Thereafter a processor 75a is provided to access the memories R1-R4 to coherently combine the stored values of PDP sets of corresponding PDPs of the four segments, i.e. each PDP set defined by one PDP from each of A1, A2, A3 and A4, to perform the following steps:

Find all positions of Rj, j=1 to 4, that occur twice per PDP set. Combine the found complex amplitudes coherently and store the results and the related positions in a software construct S2.

Find all positions of Rj, j=1 to 4, that occur three times per PDP set. Combine the found complex amplitudes coherently and store the results and the related positions in a software construct S3.

Find all positions per PDP set that occur in each of the four sets Rj, j=1 to 4. Combine the found complex amplitudes coherently and store the results and the related positions in a software construct S4.

Instead of coherent combining, noncoherent combing and/or a combination of the two is performed based on the alternate MAG locations $MAG^2$, $MAG^3$ as discussed above.

Processing continues with a comparison against respective thresholds K1, K2, K3 for each PDP set's values passed to S2, S3 and S4. If a candidate is above a threshold its position is stored and the Preamble is detected. Thresholds are different for S2, S3 and S4 due to the number of values combined. Thresholds are also different for coherent and noncoherent metrics based upon their characteristic values, but are selected to achieve a desired False Alarm and Missed Detection rate.

Preselection by Sorting Utilizing known Maximum Positions.

Referring to FIG. 14, an overall diagram of the process is provided from the production magnitude approximation values by the MAG based on the expanded PDPs with interpolated values to the passing of threshold qualified expanded PDP magnitude approximation values and associated positions to the RAKE finger control of a RAKE receiver. A preferred distribution between hardware and software implementation of the various functions is indicated by the slight shading of the functions preferred to be implemented in hardware.

MAG functionality can optionally be implemented in a different location, depending upon whether coherent and/or noncoherent combination of expanded PDP values is desired. FIG. 14 illustrates a preferred embodiment where noncoherent combining of expanded PDP values is done by adding their magnitude approximation values. Accordingly, the preselection by sorting utilizing known maximum positions preferably proceeds as set forth in FIG. 14 with the timing set forth in FIG. 15.

The first segment PDPs are generated, interpolated and have their magnitudes approximated to produce the matrix of expanded PDP magnitude approximation values represented by A1. Those values are preferably passed through a sorting device to find N1 highest maximum values per PDP that are passed to a register $R1'_{val}$ in ranked order with respective position values passed to a corresponding position register $R1'_{pos}$. The N1 highest maximum values are then resorted in accordance with position order and the resorted N1 maximum values per PDP are stored in a memory $R1_{val}$ with respective position values passed to a corresponding position memory $R1_{pos}$. A distribution device associated with the $R1_{val}$ and $R1_{pos}$ memories selectively passes the N1 maximum magnitude and position values of a respective first segment PDP to a software construct combining device S4 when corresponding position values for corresponding second, third and fourth segment PDPs have been stored as discussed below.

The second segment PDPs are generated, interpolated and have their magnitudes approximated to produce the matrix of expanded PDP magnitude values represented by A2. Those values are first passed through a position matching device to extract magnitude and position values, per second segment PDP, corresponding to the positions of the N1 highest maximum values of each corresponding first segment PDP which are then stored in a memory R21. The remaining second segment PDP values, represented by A2', are passed through a sorting device to find N2 highest maximum values per PDP that are passed to a register $R2'_{val}$ in ranked order with respective position values passed to a corresponding position register $R2'_{pos}$. The N2 highest maximum values are then resorted in accordance with position order and the resorted N2 maximum values per PDP are stored in a memory $R2_{val}$ with respective position values passed to a corresponding position memory $R2_{pos}$. A distribution device associated with the $R2_{val}$ and $R2_{pos}$ memories selectively passes the N2 maximum magnitude and position values of a respective second segment PDP to a software construct combining device S3 when corresponding position values for corresponding third and fourth segment PDPs have been stored as discussed below.

The third segment PDPs are generated, interpolated and have their magnitudes approximated to produce the matrix of expanded PDP magnitude values represented by A3. Those values are first passed through a position matching device to extract magnitude and position values, per third segment PDP, corresponding to the positions of the N1 highest maximum values of each corresponding first segment PDP which are then stored in a memory R31 and corresponding to the positions of the N2 highest maximum values of each corresponding second segment PDP which are then stored in a memory R32. The remaining third segment PDP values, represented by A3', are passed through a sorting device to find N3 highest maximum values per PDP that are passed to a register $R3'_{val}$ in ranked order with respective position values passed to a corresponding position register $R3'_{pos}$. The N3 highest maximum values are then resorted in accordance with position order and the resorted N3 maximum values per PDP are stored in a memory $R3_{val}$ with respective position values passed to a corresponding position memory $R3_{pos}$. A distribution device associated with the $R3_{val}$ and $R3_{pos}$ memories selectively passes the N3 maximum magnitude and position values of a respective second segment PDP to a software construct combining device S2 when corresponding position values for corresponding fourth segment PDPs have been stored as discussed below.

The fourth segment PDPs are generated, interpolated and have their magnitudes approximated to produce the matrix of expanded PDP magnitude values represented by A4. Those values are passed through a position matching device to extract magnitude and position values, per fourth segment PDP, corresponding to:

the positions of the N1 highest maximum values of each corresponding first segment PDP which are then stored in a memory R41, the positions of the N2 highest maximum values of each corresponding second segment PDP which are then stored in a memory R42, and the positions of the N3 highest maximum values of each corresponding second segment PDP which are then stored in a memory R43.

Once N1 elements of a fourth segment PDP are stored in the R41 memory, a distribution device associated with the R41 memory, in conjunction with similar distribution devices associated respectively with the R31, R21 memories and in conjunction with the distribution device associated with the $R1_{val}$ and $R1_{pos}$ memories, can selectively pass a complete set of values to the software construct combining device S4. Such a complete set of values is constituted of the magnitude and position values that correspond to the N1 positions of N1 maximum first segment PDP values for each of corresponding first, second, third and fourth segment PDPs. The software construct S4 then passes a combined magnitude value with a respective position value to an associated threshold comparison unit where the combined magnitude values are compared against a threshold K1. The combined magnitude values that exceed the K1 threshold are then passed with their respective position values to the RAKE finger control of a RAKE receiver.

Once N2 elements of a fourth segment PDP are stored in the R42 memory, a distribution device associated with the R42 memory, in conjunction with a similar distribution device associated with the R32 memory and in conjunction with the distribution device associated with the $R2_{val}$ and $R2_{pos}$ memories, can selectively pass a complete set of values to the software construct combining device S3. Such a complete set of values is constituted of the magnitude and position values that correspond to the N2 positions of N2 maximum second segment PDP values for each of corresponding second, third and fourth segment PDPs. The software construct S3 then passes a combined magnitude value with a respective position value to an associated threshold comparison unit where the combined magnitude values are compared against a threshold K2. The combined magnitude values that exceed the K2 threshold are then passed with their respective position values to the RAKE finger control of a RAKE receiver.

Once N3 elements of a fourth segment PDP are stored in the R43 memory, a distribution device associated with the R43 memory, in conjunction with the distribution device associated with the $R3_{val}$ and $R3_{pos}$ memories, can selectively pass a complete set of values to the software construct combining device S2. Such a complete set of values is constituted of the magnitude and position values that correspond to the N3 positions of N3 maximum third segment PDP values for each of corresponding third and fourth segment PDPs. The software construct S2 then passes a combined magnitude value with a respective position value to an associated threshold comparison unit where the combined magnitude values are compared against a threshold K3. The combined magnitude values that exceed the K3 threshold are then passed with their respective position values to the RAKE finger control of a RAKE receiver. The respective thresholds K1, K2, K3 are different for S2, S3 and S4 due the number of values combined, but are selected to achieve a desired False Alarm and Missed Detection rate.

The number of elements per PDP processed above is intended to include additional elements created through interpolation and can be referred to as L'. Preferably interpolation doubles the number of elements per PDP so that for PDPs originally produced with L elements, L'=2*L. The total number N1+N2+N3 of maximum values is always selected to less than half of L', but is preferably substantially less than that number. For example, where a search window is 1024 chips which results in L'=2048 due to doubling by interpolation, N1 is preferably 90 that the highest 90 PDP values are selected from each PDP of A1'; N2 is preferably 80 that the highest 80 PDP values are selected from each PDP of A2'; and N3 is preferably 50 that the highest 50 PDP values are selected from each PDP of A3'.

Preselection by Threshold Comparison Utilizing Known Positions.

Referring to FIG. 16, an overall diagram of the process is provided from the production magnitude approximation values by the MAG based on the expanded PDPs with interpolated values to the passing of threshold qualified expanded PDP magnitude approximation values and associated positions to the RAKE finger control of a RAKE receiver. A preferred distribution between hardware and software implementation of the various functions is indicated by the slight shading of the functions preferred to be implemented in hardware.

MAG functionality can optionally be implemented in a different location, depending upon whether coherent and/or noncoherent combination of expanded PDP values is desired. FIG. 16 illustrates a preferred embodiment where noncoherent combining of expanded PDP values is done by adding their magnitude approximation values. Accordingly, the preselection by sorting utilizing known maximum positions preferably proceeds as set forth in FIG. 16.

The first segment PDPs are generated, interpolated and have their magnitudes approximated to produce the matrix of expanded PDP magnitude values represented by A1. Those values are preferably passed through a threshold comparison unit where the magnitude values are compared against a threshold K4. The magnitude values that exceed the K4 threshold are then passed to a memory $R1_{val}$ with respective position values passed to a corresponding position memory $R1_{pos}$. A distribution device associated with the $R1_{val}$ and $R1_{pos}$ memories selectively passes K4 qualified magnitude and position values of a respective first segment PDP to a software construct combining device S4 when corresponding position values for corresponding second, third and fourth segment PDPs have been stored as discussed below.

The second segment PDPs are generated, interpolated and have their magnitudes approximated to produce the matrix of expanded PDP magnitude values represented by A2. Those values are first passed through a position matching device to extract magnitude and position values, per second segment PDP, corresponding to the positions of the K4 qualified magnitude values of each corresponding first segment PDP which are then stored in a memory R21. The remaining second segment PDP values, represented by A2', are passed through a threshold comparison unit where the magnitude values are compared against a threshold K5. The magnitude values that exceed the K5 threshold are then passed to a memory $R2_{val}$ with respective position values passed to a corresponding position memory $R2_{pos}$. A distribution device associated with the $R2_{val}$ and $R2_{pos}$ memories selectively passes the K5 qualified magnitude and position values of a respective second segment PDP to a software construct combining device S3 when corresponding position values for corresponding third and fourth segment PDPs have been stored as discussed below.

The third segment PDPs are generated, interpolated and have their magnitudes approximated to produce the matrix of expanded PDP magnitude values represented by A3. Those values are first passed through a position matching device to extract magnitude and position values, per third segment PDP, corresponding to the positions of the K4 qualified magnitude values of each corresponding first segment PDP which are then stored in a memory R31 and corresponding to the positions of the K5 qualified magnitude values of each corresponding second segment PDP which are then stored in a memory R32. The remaining third segment PDP values, represented by A3', are passed through a threshold comparison unit where the magnitude values are compared against a threshold K6. The magnitude values that exceed the K6 threshold are then passed to a memory $R3_{val}$ with respective position values passed to a corresponding position memory $R3_{pos}$. A distribution device associated with the $R3_{val}$ and $R3_{pos}$ memories selectively passes the K6 qualified magnitude and position values of a respective second segment PDP to a software construct combining device S2 when corresponding position values for corresponding fourth segment PDPs have been stored as discussed below.

The fourth segment PDPs are generated, interpolated and have their magnitudes approximated to produce the matrix of expanded PDP magnitude values represented by A4. Those values are passed through a position matching device to extract magnitude and position values, per fourth segment PDP, corresponding to:

the positions of the K4 qualified magnitude values of each corresponding first segment PDP which are then stored in a memory R41, the positions of the K5 qualified magnitude values of each corresponding second segment PDP which are then stored in a memory R42, and the positions of the K6 qualified magnitude values of each corresponding second segment PDP which are then stored in a memory R43.

Once all elements corresponding to first segment K4 qualified magnitude value positions of a fourth segment PDP are stored in the R41 memory, a distribution device associated with the R41 memory, in conjunction with similar distribution devices associated respectively with the R31, R21 memories and in conjunction with the distribution device associated with the $R1_{val}$ and $R1_{pos}$ memories, can selectively pass a complete set of values to the software construct combining device S4. Such a complete set of values is constituted of the magnitude and position values that correspond to the first segment K4 qualified magnitude value positions for each of corresponding first, second, third and fourth segment PDPs. The software construct S4 then passes a combined magnitude value with a respective position value to an associated threshold comparison unit where the combined magnitude values are compared against a threshold K1. The combined magnitude values that exceed the K1 threshold are then passed with their respective position values to the RAKE finger control of a RAKE receiver.

Once all elements corresponding to second segment K5 qualified magnitude value positions of a fourth segment PDP are stored in the R42 memory, a distribution device associated with the R42 memory, in conjunction with a similar distribution device associated with the R32 memory and in conjunction with the distribution device associated with the $R2_{val}$ and $R2_{pos}$ memories, can selectively pass a complete set of values to the software construct combining device S3. Such a complete set of values is constituted of the magnitude and position values that correspond to the second segment K5 qualified magnitude value positions for each of corresponding second, third and fourth segment PDPs. The software construct S3 then passes a combined magnitude value with a respective position value to an associated threshold comparison unit where the combined magnitude values are compared against a threshold K2. The combined magnitude values that exceed the K2 threshold are then passed with their respective position values to the RAKE finger control of a RAKE receiver.

Once all elements corresponding to third segment K6 qualified magnitude value positions of a fourth segment PDP are stored in the R43 memory, a distribution device associated with the R43 memory, in conjunction with the distribution device associated with the $R3_{val}$ and $R3_{pos}$ memories, can selectively pass a complete set of values to the software construct combining device S2. Such a complete set of values is constituted of the magnitude and position values that correspond to the third segment K6 qualified magnitude value positions for each of corresponding third and fourth segment PDPs. The software construct S2 then passes a combined magnitude value with a respective position value to an associated threshold comparison unit where the combined magnitude values are compared against a threshold K3. The combined magnitude values that exceed the K3 threshold are then passed with their respective position values to the RAKE finger control of a RAKE receiver.

The number of elements per PDP processed above is intended to include additional elements created through interpolation and can be referred to as L'. Preferably interpolation doubles the number of elements per PDP so that for PDPs originally produced with L elements, L'=2*L. The K4, K5 and K6 thresholds are always selected so that the total number of PDP elements per PDP passed to the memories is less than half of L', but is preferably substantially less than that number. The K4, K5 and K6 thresholds can all be the same value and preferably set with values lower than the K1 threshold. The respective thresholds K1, K2, K3 are different for S2, S3 and S4 due the number of values combined. Collectively the thresholds are selected to achieve a desired False Alarm and Missed Detection rate.

The post processing discussed above is not only applicable for the case of selectively combing PDPs of preamble segments, such as 3GPP RACH and CPCH preambles, but can also be used to combine PDP updates such as are generated for Path Search. In a 3GPP setting, it is not uncommon that the detection of the power delay profile PDP of a certain UE—Node B connection and the related finger assignment of the Rake Receiver may take up to one radio frame (10 ms) which is long enough to completely change the fading conditions that were valid for the PDP estimation. Therefore, it is desirous that Path Search is designed in that way that (unless for very low velocities) all connections from UEs to a Node B are detected and kept until it is decided that the path connection does not exist anymore. By averaging the PDP results over a certain time period, a path can be maintained even if a particular PDP update reflects its disappearance as long as it is redetected within a certain time period.

Generally, noncoherent accumulation increases signal to noise ratio (SNR) and is not restricted by fading conditions and thus is desirable over a relatively long time period. The length of time is generally restricted by the update rate of the allocated paths at the Rake receiver. This update rate can be once per system frame and, in such a situation, the duration of noncoherent accumulation is preferably not be longer than one time frame.

Averaging of the candidate profiles over a certain time period can avoid losing a valid path where momentary detection thereof does not occur. This time period depends on relative velocity and mobility environment. A reasonable value is 5 frames or 50 ms.

A 3GPP Node B is typically equipped to receive transmissions with two antennas. The sequence detection system configured for Path Search can readily exploit the RX diversity of dual antenna reception. Dual receive antennas are generally uncorrelated with respect to fast fading, but correlated with respect to slow fading. In other words: the detected location of the signal paths is the same on both antennas but the amplitude of the paths is different. This can be exploited by noncoherent combining of PDPs produced based on respective signals received from the two antennas to result in a noise reduction and in fading mitigation.

Selective Path Search Control

One objective of a Path Searcher is to identify new signal paths and track previously detected signal paths with respect to their timely movement. The timely movement is caused by the frequency offset seen from the Node B. This frequency offset is the sum of the Doppler Offset introduced by a mobile WTRU's velocity and the frequency offset introduced by its oscillators.

As noted above, some or all path connections from a WTRU to a base station can suffer from fast fading. Depending on the velocity of the mobile WTRU, path connections can seem to disappear caused by interference, but then appear again. Degradation by fading does not mean that the connection does not exist; it can reflect that the path is momentarily not recognizable because of phase interference. A path may often reappear after a mobile WTRU has moved on the order of half a wavelength.

In order to facilitate path search, each transmitting WTRU with which a communication has been established can, for example, continually broadcast a pilot sequence on a pilot channel with a unique spreading code relative to the other transmitting WTRUs with which communication has been established. One known transmission format for a pilot sequence is to repetitively transmit the pilot symbol in timeslots of a system timeframe where each time slot is defined by 10 symbols and each symbol consists of 256 chips. A unique scrambling code is used to encode the pilot signals for each transmitting WTRU communicating with the base station so it is possible to coherently combine all of the chips of an entire timeslot based on vector correlation with the respective scrambling codes even if not all the symbols that are transmitted are the same.

The sequence detection system 30 can be used to generate PDPs for each communication being received from a different WTRU in a serial manner by changing the generated sequence to reflect different spreading codes for the generation of successive PDPs. Where for example, concurrent communications are being conducted with four WTRUs, PDPs for each can be successively generated and then the process repeated to provide updated PDP values.

Figures 17, 18:
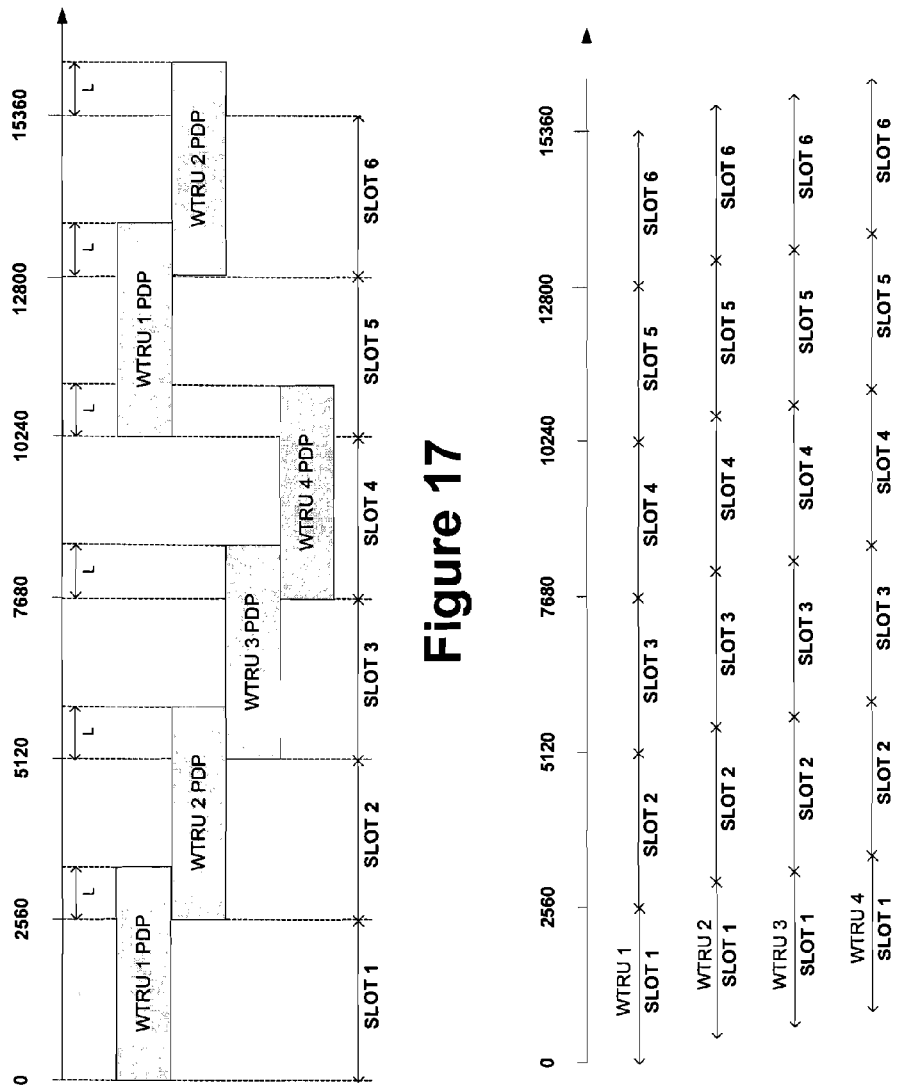
FIG. 17 is a processing diagram of timing scheduling of sequence detection for successive path searching with respect to four perfectly synchronized received signals transmitted by four different WTRUs.
FIG. 18 is a comparative diagram of timing offset of received signals transmitted by four different WTRUs.

One approach for generating successive PDPs for received signals from different WTRUs is to begin coherent accumulation for each successive PDP at the start of a time slot. FIG. 17 illustrates the case of repeatedly processing successive PDPs of length L for four WTRUs, WTRU 1, WTRU 2, WTRU 3, WTRU 4 where the received signals happen to be precisely synchronized and the transmissions are made in time slots of ten 256 chip symbols per time slot so that the time slots have a length of 2560. Since the received signals are synchronized, the beginning of each time slot of every signal is precisely aligned with the end of the previous time slot signals for all of the WTRUs. Accordingly, in this example, there is a delay of precisely four PDP time slots between completion of update PDPs for a particular WTRU's signal. This is reflected in FIG. 17 where one PDP for WTRU 1 is completed at the end of time slot 1 plus L chips and the next PDP for WTRU 1 is completed at the end of time slot 5 plus L chips.

Precise synchronization of received signals, however, is difficult to achieve and maintain in practice, particularly where the transmitting WTRUs are mobile. For example, a significant characteristic of a 3GPP FDD system is that UE signals reaching a Node B are not synchronized. Therefore each UE-Node B connection has a different timing.

Generally the timing of at least one relatively strong path for each different received transmission is known from which a transmission's relative time frame start position is identified. Accordingly, the received signals can be ordered for processing on a priority of reception basis with knowledge of the amount of timing offset between each different signal. FIG. 18 illustrates how received signals for four WTRUs may be offset in time. WTRU 1 being illustrated as the first received signal of the four signals and WTRU 4 being illustrated as the last received signal of the four signals. Since the WTRU received signals are not synchronized, in scheduling the PDP processing timing adjustment delays are required.

FIG. 19 illustrates the case of repeatedly processing successive PDPs of length L for four WTRUs, WTRU 1, WTRU 2, WTRU 3, WTRU 4 of FIG. 18 where the received signals are not synchronized and the transmissions are made in time slots of ten 256 chip symbols per time slot so that the time slots have a length of 2560. Since the received signals are not synchronized, there is a timing delay equal to the timing required before beginning of each successive PDP generation. For example, the generation of the PDP for WTRU 2 starts at the beginning of WTRU 2's time slot 2 which has a timing offset from the end of WTRU 1's time slot 1 so the start of the processing of the WTRU 2 PDP is delayed by that amount of time. Similarly, the generation of the PDP for WTRU 3 starts at the beginning of WTRU 3's time slot 3 which has a timing offset from the end of WTRU 2's time slot 2 so the start of the processing of the WTRU 3 PDP is delayed by that amount of time. Likewise, the generation of the PDP for WTRU 4 starts at the beginning of WTRU 4's time slot 4 which has a timing offset from the end of WTRU 3's time slot 3 so the start of the processing of the WTRU 4 PDP is delayed by that amount of time.

At the end of WTRU 4's time slot 4, the next PDP for WTRU 1 is scheduled for generation. However, at that time a cumulative delay of D chips has occurred with respect to the timing of the WTRU 1 signal. Accordingly, processing of the next PDP for the WTRU 1 received signal can not start at the beginning of WTRU 1's slot 5, but is delayed until the beginning of WTRU 1's slot 6, a delay of 2560-D chips. Since all PDP processing in this example starts at the beginning of a signal's time slot, the delay characteristic can be referred to as time slot granularity.

The inventors have recognized that in certain circumstances equivalent PDPs can be produced which are not limited to time slot transmissions. In particular, the inventors have recognized that for typical pilot signals transmitted by 3GPP specified WTRUs, accumulation of samples over an equal number of successive symbols of a signal sample will result in an equivalent PDP usable to Path Search updates. Accordingly, the coherent accumulator unit 31 of the sequence detector 30 can be advantageously configured to produce successive PDPs for non synchronized received signals of different WTRUs with only a symbol based granularity delay. Accumulation values for the produced PDPs are still based on 2560 chip accumulations for each PDP element, but the start of processing of each PDP is only required to be relative to the start of a transmitted symbol, not the start of a time slot.

FIG. 20 illustrates the case of repeatedly processing successive PDPs of length L for four WTRUs, WTRU 1, WTRU 2, WTRU 3, WTRU 4 of FIG. 18 where the received signals are not synchronized and the transmissions are made in time slots of ten 256 chip symbols per time slot so that the time slots have a length of 2560. Since the received signals are not synchronized, there is a timing delay equal to the timing required before beginning of each successive PDP generation. For example, the generation of the PDP for WTRU 2 starts at the beginning of WTRU 2's time slot 2 which has a timing offset from the end of WTRU 1's time slot 1 so the start of the processing of the WTRU 2 PDP is delayed by that amount of time. Similarly, the generation of the PDP for WTRU 3 starts at the beginning of WTRU 3's time slot 3 which has a timing offset from the end of WTRU 2's time slot 2 so the start of the processing of the WTRU 3 PDP is delayed by that amount of time. Likewise, the generation of the PDP for WTRU 4 starts at the beginning of WTRU 4's time slot 4 which has a timing offset from the end of WTRU 3's time slot 3 so the start of the processing of the WTRU 4 PDP is delayed by that amount of time.

At the end of WTRU 4's time slot 4, the next PDP for WTRU 1 is scheduled for generation. As with the processing based on time slot granularity illustrated in FIG. 19, at that time a cumulative delay of D chips has occurred with respect to the timing of the WTRU 1 signal. However, by processing on a symbol granularity basis, the processing of the next PDP for the WTRU 1 received signal need not start at the beginning of WTRU 1's next occurring timeslot, i.e. WTRU 1's slot 6, but is scheduled to commence at WTRU 1's next occurring symbol, a delay of less than 256 which is significantly less than the 2560-D chip delay in the case of time slot granularity. Arbitrarily denoting the symbol as J, FIG. 20 illustrates that the accumulation of PDP values is with respect to the Jth Symbol of WTRU 1's Slot 5 through the (J−1)th Symbol of WTRU 1's Slot 5. The production of the next PDPs for the other WTRUs similarly commence with the Jth Symbol of a respective time slot.

In general, PDP production with the sequence detector 30 is applicable based on symbol granularity where a series of J symbols, SYM(0) to SYM(J−1), having a bit size B are transmitted per time slot and I symbols are coherently accumulated for each PDP element. PDP production is then preferably controlled to selectively produce successive PDPs with respect to received WTRU wireless signals such that when N pilot signals are concurrently received, PDPs are produced for respective wireless signals, WS(0) to WS(N−1), in order of earliest to latest received signal derived from the known timing. Starting with a first earliest received wireless signal WS(0), a PDP is produced beginning on the occurrence a symbol SYM(j) with respect to time slot having the receive timing of the first wireless signal WS(0). PDP production continues successively for each subsequently received wireless signal, WS(n) for n=1 to N−1, beginning, after a time alignment delay based on the known timing of the signal WS(n), on the occurrence a symbol SYM((j+(I*n))mod J) with respect to a time slot having the receive timing of the wireless signal WS(n) whereby the processing of the PDP for the latest received wireless signal WS(N−1) begins with a cumulative delay of D chips relative to the start of the symbol SYM((j+(I*(N−1)))mod J) with respect to a time slot having the receive timing of the first wireless signal WS(0). The next PDP produced for the first received wireless signal WS(0) begins on the occurrence a symbol SYM(K) with respect to a time slot having the receive timing of the first wireless signal WS(0), where K is the greatest integer less than ((j+(I*(N−1))+(D/B)) mod J.

The example of FIG. 20 illustrates the case where the coherent accumulation for PDP elements is performed over the number of symbols in one time slot, i.e. I=J. In such a case, PDP production continues successively for each subsequently received wireless signal, WS(n) for n=1 to N−1, begins, after a time alignment delay based on the known timing of the signal WS(n), on the occurrence a symbol SYM (j) with respect to a time slot having the receive timing of the wireless signal WS(n) and the next PDP produced for the first received wireless signal WS(0) begins on the occurrence a symbol SYM(K) with respect to a time slot having the receive timing of the first wireless signal WS(0), where K is the greatest integer less than (j+(D/B)) mod J.

The reduction in processing delay is even more significant since it is cumulative over time. Each time a WTRU 1 PDP is to be generated a similar delay of less then 256 chips is encountered using Symbol granularity scheduling in contrast to the 2560-D chip delay for time slot granularity processing.

The scheduling on a symbol basis and instead of a slot basis does not produce exactly the same result in processing a received 3GPP signal on a pilot channel since 3GPP specifications permit the transmission of more than one type of 256 bit symbol. However, the difference is relatively minimal and compensation can be made by doing more noncoherent accumulations compared to a scheduling on slot basis.

Scheduling the coherent accumulation unit 40 to produce PDPs for the same received signal at different times allows time diversity for the non-coherent accumulation. This is particularly useful for improving performance by countering various path fading characteristics of received signals. This can be referred to as non-pseudo-random scheduling of the vector correlator which can be compared with the pseudo-random approach such as disclosed in U.S. patent application Ser. No. 10/304,403 filed Nov. 26, 2002 entitled RECEIVER FOR WIRELESS TELECOMMUNICATION STATIONS AND METHOD published as Publication No. US-2003-0152167-A1 on Aug. 14, 2003 and owned by the assignee of the present invention. However, non-pseudo-random scheduling of the vector correlator provides essentially equivalent performance at a lower implementation cost.

Preferably, the components of FIGS. 8-12, 14, and 16 are implemented on an single integrated circuit, such as an application specific integrated circuit (ASIC). However, the components may also be readily implemented on multiple separate integrated circuits. Elements indicated as having a preferred implementation in software may be supplied as firmware on such ASICs.

The foregoing description makes references to 3GPP and 3GPP FDD systems as examples only and not as a limitation. The invention is applicable to other systems of wireless communication where known sequences are detected by WTRU receivers. Other variations and modifications consistent with the invention will be recognized by those of ordinary skill in the art.

What is claimed is:

1. A wireless transmit receive unit (WTRU) for use in wireless communications comprising:
 a post processing unit configured to process power delay profiles (PDPs) of received wireless signals where each PDP has a selected number of sequential elements that have values representing coherent accumulation of sequential sets of received samples mixed with a known sequence;

the post processing unit configured to select less than half of the PDP elements of each PDP and to store the selected PDP elements' values and respective PDP position values;

the post processing unit further configured to selectively combine stored PDP values such that the values of elements of each PDP of a set of corresponding PDPs that are stored for the same respective PDP position are combined; and the post processing unit further configured to evaluate the combined values for respective PDP positions against selected thresholds to pass threshold qualified combined values and respective position values for further signal processing for use in determining received signal paths of signals from which the respective PDP elements are produced.

2. The WTRU of claim 1 wherein the post processing unit is configured to select PDP elements based on highest values of PDP elements of each PDP.

3. The WTRU according to claim 2 where the PDP element values contain in-phase and quadrature components wherein the post processing unit is configured to selectively combine stored PDP element values by coherent combination for threshold evaluation and the post processing unit is further configured to compute a magnitude approximation value for each combined value that is threshold qualified whereby the magnitude approximation value and a respective position value are utilized for further signal processing in determining received signal paths.

4. The WTRU according to claim 2 where the PDP element values contain in-phase and quadrature components wherein the post processing unit is configured to selectively combine stored PDP element values by coherent combination for threshold evaluation and the post processing unit is further configured to:

compute a magnitude approximation value for each stored PDP element value;

noncoherently combine magnitude approximation values corresponding PDP element values that are coherently combined; and separately evaluate both coherently and noncoherently combined values against thresholds to qualify values of respective PDP positions for further signal processing in determining received signal paths.

5. The WTRU according to claim 1 where the PDP element values processed by the post processing unit are magnitude approximations of coherent accumulations of sequential sets of signal samples wherein the post processing unit is configured to selectively combine stored PDP element values by noncoherent combination for threshold evaluation.

6. The WTRU according to claim 1 wherein the post processing unit is configured to process PDPs in a plurality of groups such that:

a limited number of PDP elements are selected from a first group of PDPs and elements' values and respective position values of the selected first group PDP elements are stored;

elements' values and respective position values of respectively positioned elements are stored from each corresponding PDP of a PDP set as each other group of PDPs is processed; and a limited number of other elements are selected from PDPs which do not match any positions of the elements selected from the PDPs of the first group.

7. The WTRU according to claim 6 wherein the post processing unit is configured to select elements from the first group PDPs based on selecting a selected number of highest values of PDP elements.

8. The WTRU according to claim 6 wherein the post processing unit is configured to select elements from the first group PDPs by threshold qualification where the threshold is set such that less than one-quarter of the elements of a PDP are selected from each of the first group PDPs.

9. The WTRU of claim 6 further comprising:

an interpolation unit configured to operate at a clock speed of at least twice sampling rate of a PDP production unit and to interpolate groups of PDPs produced by the PDP production unit to provide a corresponding number of at least twice as many PDP elements to the post processing unit.

10. The WTRU according to claim 1 wherein the post processing unit comprises:

a hardware unit configured to select the PDP elements of each PDP and to store the selected PDP elements' values and respective PDP position values; and a software unit configured to selectively combine and evaluate the stored PDP.

11. The WTRU of claim 10 further comprising:

an interpolation unit configured to operate at a clock speed of at least twice sampling rate of a PDP production unit and to interpolate groups of PDPs produced by the PDP production unit to provide a corresponding number of at least twice as many PDP elements to the post processing unit.

12. The WTRU of claim 1 further comprising:

an interpolation unit configured to operate at a clock speed of at least twice sampling rate of a PDP production unit and to interpolate groups of PDPs produced by the PDP production unit to provide a corresponding number of at least twice as many PDP elements to the post processing unit.

13. The WTRU according to claim 1 wherein the post processing unit comprises:

a hardware unit configured to select the PDP elements of each PDP and to store the selected PDP elements' values and respective PDP position values and a software unit configured to selectively combine and evaluate the stored PDP values.

14. The WTRU of claim 13 further comprising:

an interpolation unit configured to operate at a clock speed of at least twice sampling rate of a PDP production unit and to interpolate groups of PDPs produced by the PDP production unit to provide a corresponding number of at least twice as many PDP elements to the post processing unit.

* * * * *